US008224187B2

(12) United States Patent
Nishino et al.

(10) Patent No.: US 8,224,187 B2
(45) Date of Patent: Jul. 17, 2012

(54) ELECTRONIC DEVICE FOR TRANSMITTING AND RECEIVING INFORMATION BY MEANS OF LASER LIGHT

(75) Inventors: Naoyuki Nishino, Ashigarakami-gun (JP); Yasunori Ohta, Ashigarakami-gun (JP); Takeshi Misawa, Kurokawa-gun (JP); Eiji Ishiyama, Kurokawa-gun (JP); Atsushi Misawa, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 639 days.

(21) Appl. No.: 12/379,330

(22) Filed: Feb. 19, 2009

(65) Prior Publication Data

US 2009/0214220 A1    Aug. 27, 2009

(30) Foreign Application Priority Data

Feb. 22, 2008 (JP) ................. 2008-041545

(51) Int. Cl.
*H04B 10/00* (2006.01)
(52) U.S. Cl. ........................ 398/156; 398/201
(58) Field of Classification Search .............. 398/156
See application file for complete search history.

(56) References Cited

U.S. PATENT DOCUMENTS

| 7,265,439 B1 * | 9/2007 | Wu et al. ................ 257/678 |
| 2002/0071035 A1 * | 6/2002 | Sobol ..................... 348/207 |
| 2011/0110669 A1 * | 5/2011 | Tatum et al. ............. 398/135 |

FOREIGN PATENT DOCUMENTS

| JP | 54083463 A | 7/1979 |
| JP | B 3494683 | 6/1995 |
| JP | 2005070832 A | 3/2005 |
| JP | A 2007-81134 | 3/2007 |

OTHER PUBLICATIONS

KDDI R&D Laboratories, "The Realization of Infrared Wireless Communications at a Transmission Speed of 1Gbit/s Using a Mobile Telephone" Internet: <Url:http://www.kddilabs.jp/press/img/83_1.pdf>, (viewed Jan. 21, 2008).

* cited by examiner

*Primary Examiner* — Nathan Curs
(74) *Attorney, Agent, or Firm* — SOLARIS Intellectual Property Group, PLLC

(57) ABSTRACT

The main power source unit of an image read-out device supplies power to an laser diode (LD) power supply unit of an electronic cassette through a contact. The LD power supply unit supplies the supplied power to a laser diode (LD), as power used for emitting laser light, and also supplies a portion of the supplied power to an LD power supply unit of the image read-out device through a contact. The power supplied to the LD power supply unit of the image read-out device is supplied as power for emitting laser light to an LD of the image read-out device. When there is a change in the relative position of the casings of the electronic cassette and the image read-out device, the contact and electrical continuation of the contacts breaks and laser light stops being emitted from the LDs.

7 Claims, 14 Drawing Sheets

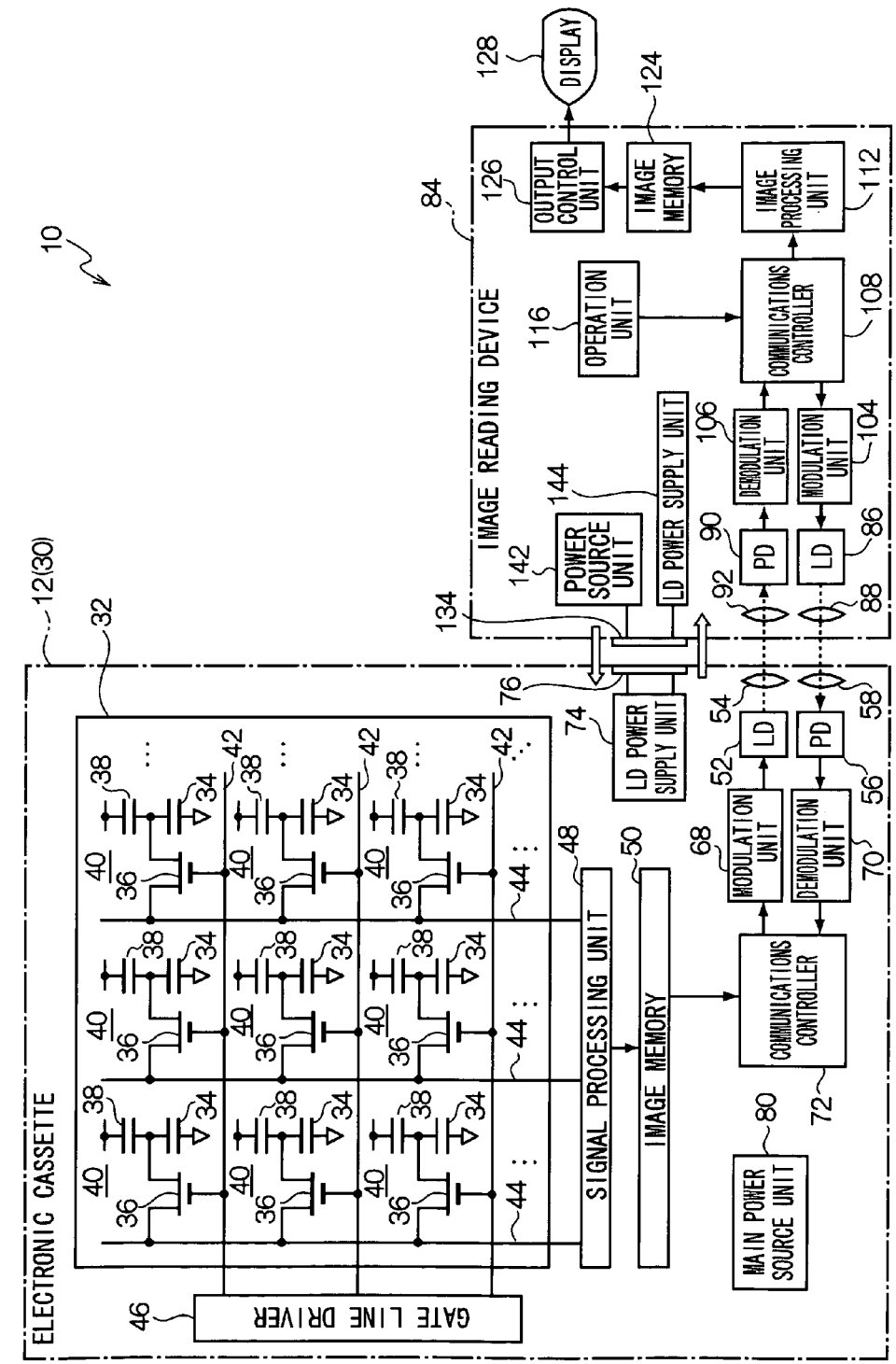

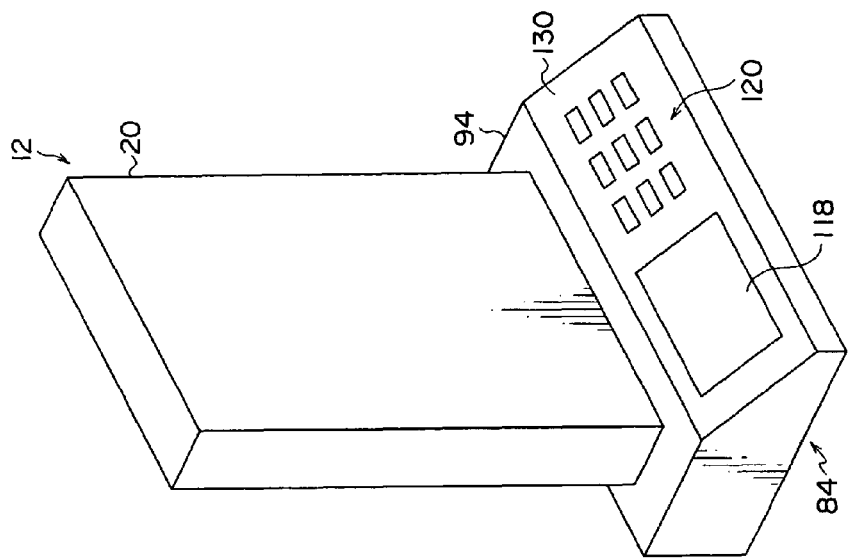
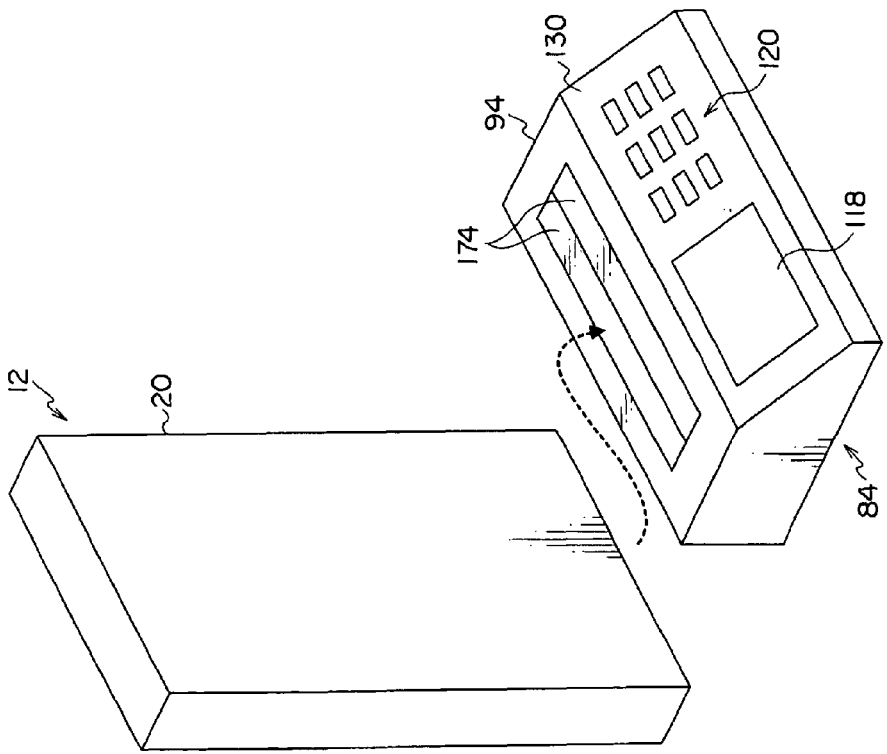

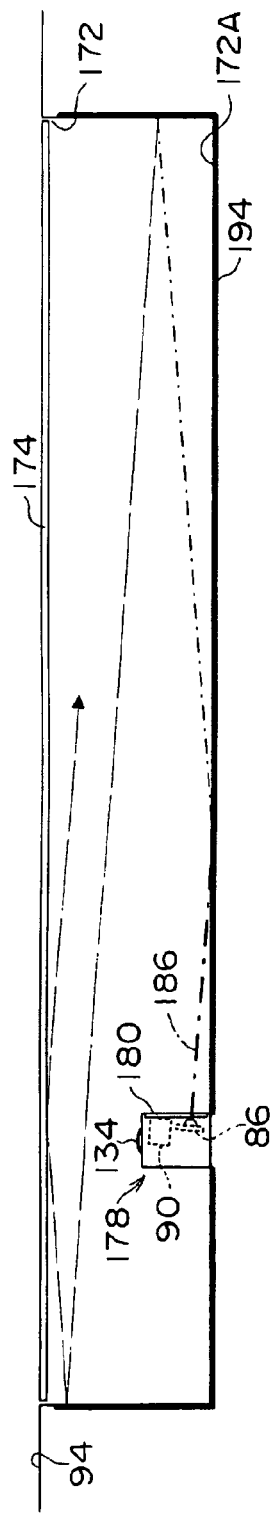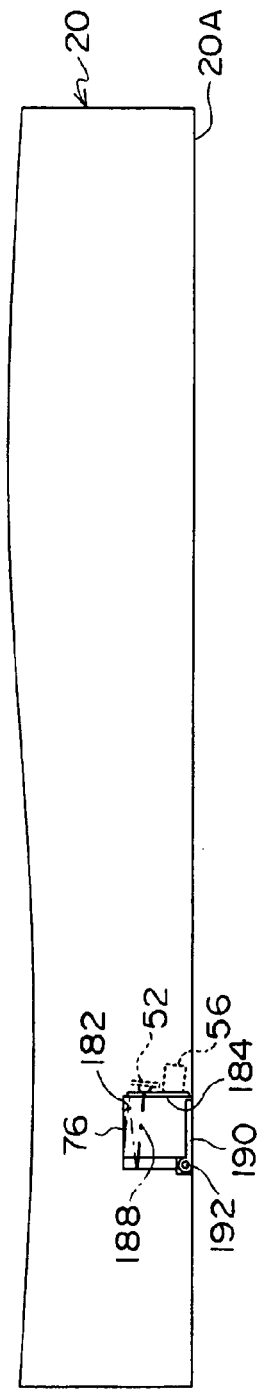

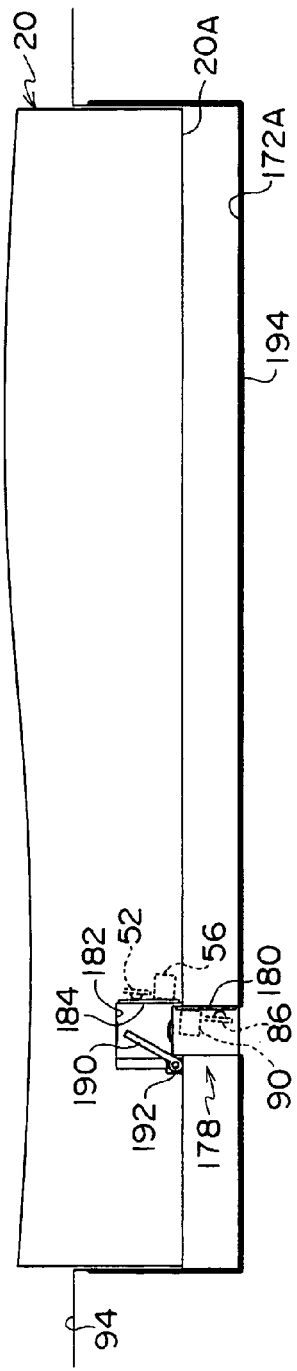
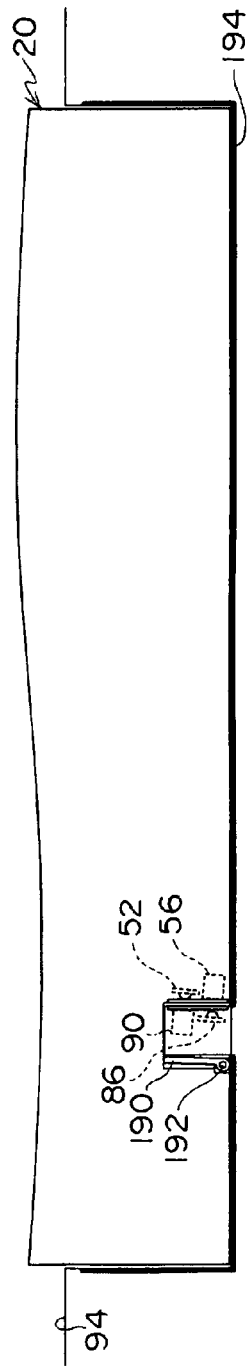

ELECTRONIC DEVICE FOR TRANSMITTING AND RECEIVING INFORMATION BY MEANS OF LASER LIGHT

CROSS-REFERENCE TO RELATED APPLICATION

This application claims priority under 35 USC 119 from Japanese Patent Application No. 2008-041545, the disclosure of which is incorporated by reference herein.

BACKGROUND OF THE INVENTION

1. Field of the Invention

The present invention relates to an electronic device, and in particular relates to an electronic device that transmits and receives information to and from an opposing device by means of laser light modulated according to the transmission information.

2. Description of the Related Art

Recently technologies have been proposed for realizing wireless communication at extremely high transmission speeds (for example 1 Gb/s) using laser light in the infrared wavelength region (KDDI R&D Laboratories, "The Realization of Infrared Wireless Communications at a Transmission Speed of 1 Gbit/s Using a Mobile Telephone" Internet: <URL:http://www.kddilabsjp/press/img/83_1.pdf>, (viewed Jan. 21, 2008)). The expectation is that when transmitting data between given electronic devices by application of this technology it should be possible to complete the transmission of a large amount of data within a short period of time without connecting a communication cable or the like between the devise for transmitting the data, even if one or more of the electronic devices is transportable and a large amount of data is to be transmitted, enabling a large reduction in communication time of wireless communication between existing electronic devices. Consequently, transmission by wireless communication of large amounts of data between devices, which would have been inconceivable using known wireless communications is expected to be realizable, along with various other applications.

For example, in Publish-ed Japanese Patent No. 3494683 a cassette for radiation detection (also called an electronic cassette) is described configured with an inbuilt radiation detection device and image memory. Radiographic images detected by the radiation detection device are stored as image data in the image memory, and image data read out from the image memory is converted into a wireless signal and output to an external signal processing circuit. In the medical field there are many devices which are preferably not placed in an environment in which electromagnetic waves are radiating. Up to now, preferable wireless communications for the above cassette have been limited, such as to infrared communication based on IrDA (Infrared Data Association) standards, and the like. However, in such types of medical equipment, while the communication speed of infrared communication based on IrDA standards is about 115 kb/s to 6 Mb/s, a low compression ratio is selected when image data is reversibly compressed, in order to avoid any adverse effect on the interpretation of radiograms. This results in image data transfer taking an extremely long period of time. In contrast, if the above described communication by laser light could be applied for wireless communication in the above cassette, a great reduction in the duration of image data transfer could be realized.

In Japanese Patent Application Laid-Open (JP-A) No. 2007-81134 related to the above, an optical communication module is configured with a laser diode provided to a lead frame, and configured with a transparent resin section, as an adjusting means for spreading out the light output distribution of the laser diode and adjusting the output thereof. The transparent resin section is configured with a transparent resin, for encapsulating the laser diode, and contains glass filler exhibiting an ability to transmit and disperse light. The glass filler is added to the transparent resin and substantially uniformly distributed within the whole of the transparent resin.

In a mode in which wireless communication is carried out using laser light between electronic devices, if one or more of the electronic devices is transportable then the wireless communication is carried out in a state in which the two electronic devices are disposed in a positional relationship enabling wireless communication. However, since one or more of the electronic devices is transportable, if the casing of the electronic device is imparted with a pressing force, vibration or the like during communication with the laser light, the relative position of the two electronic devices changes, and there is a possibility of this change in the relative position leading to laser light leakage from the space interposed between the two electronic devices.

In order to address this issue, the technology of JP-A No. 2007-81134 is a technology that realizes a spreading out of the light output distribution of the optical communication module and a reduction in the light output amount of the optical communication module by repeatedly diffracting light from the laser diode using the glass filler. There is no consideration given in this technology to laser light leakage when the relative position of the electronic devices has changed during communication by laser light.

In consideration of the above circumstances, the present invention provides an electronic device capable of ensuring safety in an inappropriate relative position with respect to an opposing device for transmission or receiving information using laser light.

SUMMARY OF THE INVENTION

An electronic device according to a first aspect of the present invention includes: a first emission unit for emitting laser light and a first modulating unit for modulating the laser light emitted from the first emission unit according to transmission information, wherein the relative position of a casing of an opposing device and a casing of the electronic device are in an adjusted state to a communication enabled position in which the laser light emitted from the first emission unit is incident within a light receiving region of the opposing device, and the transmission information is received by a receiving unit of the opposing device by detecting the laser light incident in the light receiving region, and by demodulating the transmission information from the detection result of the laser light; the electronic device including: a first contact that contacts a second contact provided on the opposing device when the relative position of the casing of the opposing device and the casing of the electronic device is in the adjusted state to the communication enabled position; and a first electrical supply unit for supplying to the first emission unit as power for emitting the laser light power that has been supplied from the opposing device through the first contact in contact with the second contact.

The electronic device according to the first aspect of the present invention is an electronic device with functionality in the device itself for emitting laser light modulated according to transmission information, wherein when the relative position of the casing of the opposing device and the casing of the electronic device is in the adjusted state to the communication enabled position in which the laser light emitted from the electronic device is incident within the light receiving region of the opposing device, the transmission information is received by the receiving unit of the opposing device by detecting the laser light incident in the light receiving region, and by demodulating the transmission information from the detection result of the laser light. In the electronic device of the first aspect of the present invention, the first contact is provided to contact the second contact provided on the opposing device when the relative position of the casing of the opposing device and the casing of the electronic device is in the adjusted state to the communication enabled position, and the first electrical supply unit supplies to the first emission unit, as power for emitting the laser light, power that has been supplied from the opposing device through the first contact in contact with the second contact.

Consequently, while a possibility might have occurred of laser light leakage from the space interposed between the electronic device and the opposing device when there is a difference in the relative position of the casing of the opposing device to the casing of the electronic device (device itself) from the communication enabled position, laser light is not emitted from the first emission unit since the first contact is not in contact with the second contact and power is not supplied from the opposing device through the first contact. In addition, while a possibility might have occurred of laser light leakage from the space interposed between the casing of the opposing device and the casing of the electronic device by displacement in the relative position thereof after being once adjusted to the communication enabled position, in such cases too, the first contact is separated from the second contact at the same time as such a displacement occurs, and power supply from the opposing device through the first contact that was in contact with the second contact is interrupted. Emission of laser light from the first emission unit is stopped by interruption in the power supply used for emission of the laser light from the first emission unit, this occurring when the above interruption in power supply occurs.

In this manner, according to the electronic device of the first aspect of the present invention, laser light emission from the electronic device is stopped when there is a difference in the relative position of the casing of the opposing device to the casing of the electronic device from the communication enabled position, and when there is a change in the relative position of the casing of the opposing device to the casing of the electronic device from the communication enabled position. Consequently laser light leakage from the space interposed between the electronic device and the opposing device can be prevented before it occurs, and safety can be assured when the relative position is inappropriate with respect to an opposing device for transmission or receiving information using laser light.

In the electronic device according to the first aspect of the present invention, preferably one of the first contact or the second contact is a cylindrical shape, and the other is a ring shape so as to be contactable with the other cylindrical shaped electrical contact around the whole of the circumference of the electrical contact, and the first contact and the second contact are attached to the respective devices such that the periphery of a light path for the laser light emitted from the first emission unit is covered by contact of the electrical contact on the electronic device with the opposing contact when the relative position of the casing of the opposing device and the casing of the electronic device is in the adjusted state to the communication enabled position. By so doing the first contact contacts the second contact even if a small displacement occurs in the relative position of the casing of the opposing device to the casing of the electronic device from the communication enabled position, and the periphery of the light path of the laser light is covered by the in-contact first contact and second contact. Consequently laser light leakage can be even more assuredly prevented when the relative position is inappropriate with respect to an opposing device for transmission or receiving information using laser light.

The electronic device according to the first aspect of the present invention, preferably further includes a control unit that monitors the power supply state from the opposing device through the first contact in contact with the second contact, and that warns when there has been a change in the power supply state, and/or stops emission of laser light from the first emission unit when there has been a change in the power supply state. There is a change in the power supply state from the opposing device through the first contact due to a change in the contact state of the first contact with the second contact when there is a change in the relative position of the casing of the opposing device to the casing of the electronic device from the communication enabled position (for example there is a change in the voltage or a short interruption of power supply etc., and the power supply state becomes unstable). The electronic device according to the first aspect of the present invention may issue a warning and/or stop emission of laser light from the first emission unit based on this change.

In cases where the control unit is configured to issue a warning when there has been a change in the power supply state, when there has been a change in the relative position of the casing of the opposing device to the casing of the electronic device from the communication enabled position, a possibility arises of laser light leakage from the space interposed between the electronic device and the opposing device. However the change in relative position is detected as a change in the power supply state by the control unit, and a user can be made aware that a state has arisen in which there is a possibility of laser light leakage from the space interposed between the electronic device and the opposing device by issuing the warning, and a user can undertake countermeasures to ensure safety. In cases where the control unit is configured to stop emission of laser light from the first emission unit when there is a change in the power supply state, when there is a change in the relative position of the casing of the opposing device to the casing of the electronic device from the communication enabled position, a possibility arises of laser light leakage from the space interposed between the electronic device and the opposing device. However the change in relative position is detected as a change in the power supply state by the control unit, and emission of laser light from the first emission unit is stopped, and the possibility of laser light leakage from the space interposed between the electronic device and the opposing device can be prevented before it occurs.

Consequently, according to the above configuration safety can be increased when the relative position of the casing of the opposing device to the casing of the electronic device changes from the communication enabled position. It should be noted that prevention of emission of laser light from the first emission unit can be realized in any one or more of the following ways such as, for example, interrupting power supply from the first electrical supply unit for use in emission of laser light from the first emission unit, stopping output of transmission information to the first modulating unit, and/or interrupting the laser light using a shutter provided at the laser light emission side of the first emission unit.

The electronic device according to the first aspect of the present invention is preferably further includes a third contact in contact with a fourth contact provided on the opposing device when the relative position of the casing of the opposing device and the casing of the electronic device is in the adjusted state to the communication enabled position, and the first electrical supply unit is preferably configured so as to supply a portion of the power supplied from the opposing device through the first contact in contact with the second contact to the opposing device through the third contact in contact with the fourth contact. In such cases, for example when configuration is made for two-way communication by laser light with the electronic device, the opposing device is also provided with a second emission unit for emitting laser light and the opposing device is configured so that power supplied through the fourth contact is supplied to the second emission unit as power for use in laser light emission. The emission of laser light from the second emission unit of the opposing device can be stopped when the relative position is inappropriate with respect to an opposing device for transmission or receiving information using laser light. Consequently safety is further increased when the relative position is inappropriate with respect to an opposing device for transmission or receiving information using laser light.

In the above configuration carrying out two-way communication between the electronic device and the opposing device using laser light can be realized, specifically, by the opposing device including: a second emission unit for emitting laser light; a second modulating unit for modulating the laser light emitted from the second emission unit according to transmission information; a second electrical supply unit for supplying power through the second contact in contact with the first contact; and a third electrical supply unit for supplying to the second emission unit, as power for emitting the laser light, power that has been supplied through the fourth contact in contact with the third contact. In this case the laser light emitted from the second emission unit of the opposing device is also incident within a light receiving region of the electronic device when the relative position of the casing of the opposing device and the casing of the electronic device is in the adjusted state to the communication enabled position. The electronic device also includes a receiving unit for receiving the transmission information from the opposing device by detecting the laser light incident within the light receiving region of the electronic device when the relative position of the casing of the opposing device and the casing of the electronic device is in the adjusted state to the communication enabled position, and demodulating the transmission information from the detection result of the laser light. Thereby, in two-way communication between the electronic device and the opposing device using laser light, as stated above, a further increase in safety can be realized when the relative position is inappropriate with respect to an opposing device for transmission or receiving information using laser light.

In the electronic device according to the first aspect of the present invention, any wavelength of laser light is applicable for the laser light, however preferable laser light of the present invention is non-visible laser light of wavelength outside of the visible region, which cannot be confirmed with the naked eye, and particularly preferable is non-visible laser light of wavelength in the infrared region.

Any device capable of carrying out information transmission and/or reception using laser light is applicable as the electronic device according to the first aspect of the present invention, and for example application can be made to one or other of an imaging device, a portable information device, a transportable radiographic imaging conversion device, or an image read-out device for reading out image information from a transportable radiographic imaging conversion device.

The present invention, as explained above, exhibits the excellent effect of enabling safety to be assured when the relative position is inappropriate with respect to an opposing device for transmission or receiving information using laser light, since power supplied from the opposing device, through the first contact in contact with the second contact provided to the opposing device when the relative position of the casing of the opposing device and the casing of the electronic device is in the adjusted state to the communication enabled position, is supplied as electrical power for laser light emission to the first emission unit.

BRIEF DESCRIPTION OF THE DRAWINGS

FIG. 1 is a block diagram showing a schematic configuration of an electronic cassette and an image reading device according to an exemplary embodiment.

FIG. 3A and FIG. 3B are perspective views of an electronic cassette and an image reading device.

FIG. 6A to FIG. 6D are side views to explain insertion of a protrusion portion of a image reading device into a groove portion of an electronic cassette when the electronic cassette is set to the image reading device.

DETAILED DESCRIPTION OF THE INVENTION

Explanation will now be given of details of an exemplary embodiment of the present invention, with reference to the drawings. A radiographic imaging handling system 10 according to the present exemplary embodiment is shown in FIG. 1. The radiographic imaging handling system 10 is configured to include a portable electronic cassette 12, the electronic cassette 12 being capable of converting into image data and storing the image information carried by radiation each time the electronic cassette 12 is irradiated, and to include an image reading device 84 capable of reading out image data stored in the electronic cassette 12. It should be noted that each of the electronic cassette 12 and the image reading device 84 correspond to the electronic device of the present invention. The electronic cassette 12 also corresponds to the portable radiographic image conversion device of the present invention, and the image reading device 84 also corresponds to the image reading device of the present invention.

Figure 2A:
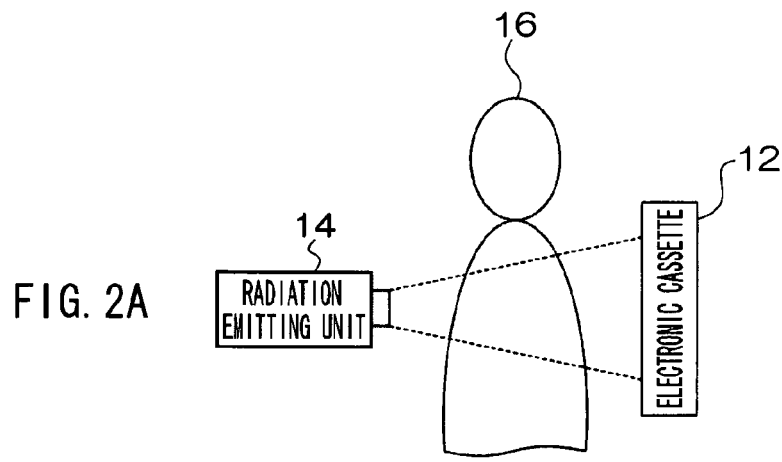
FIG. 2A is a schematic diagram showing the disposition of an electronic cassette during radiographic imaging.

During imaging of a radiographic image the electronic cassette 12 is disposed with a separation between the electronic cassette 12 and a radiation emitting unit 14 that generates radiation, such as X-rays or the like, as shown in FIG. 2A. An imaging subject 16 is positioned at an imaging position between the radiation emitting unit 14 and the electronic cassette 12, and when the taking of a radiographic image is instructed the radiation emitting unit 14 emits radiation of a radiation amount in accordance with preset imaging conditions or the like. The radiation radiated from the radiation emitting unit 14 picks up image information by transmission through the imaging subject 16 positioned at the imaging position, and is then irradiated onto the electronic cassette 12.

Figure 2B:
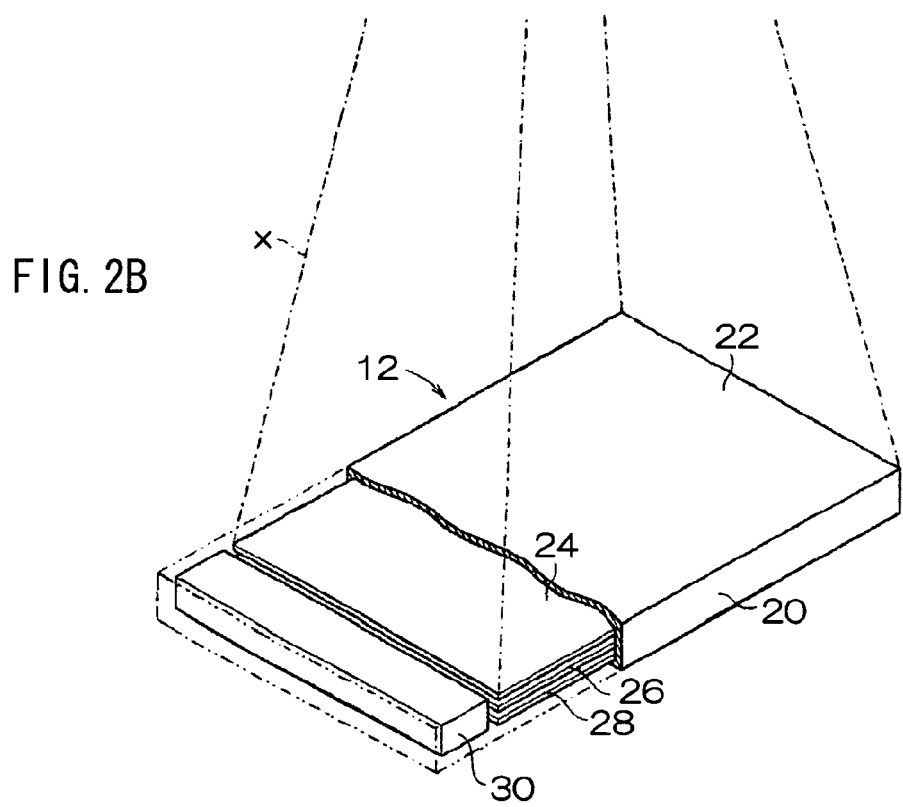
FIG. 2B is a perspective diagram showing the internal structure of an electronic cassette.

The electronic cassette 12 is covered by a flat plate-shaped casing (housing) 20 formed of a thickness of material such that X-rays can be transmitted therethrough, as shown in FIG. 2B. Within the casing 20 are disposed, in sequence from an irradiation face 22 of the casing 20, onto which the X-rays are irradiated, a grid 24 for removing any scattered X-rays generated due to transmission through the imaging subject 16, a radiation detector (radiation detection panel) 26 for detecting X-rays, and a lead plate 28 for absorbing back-scattering X-rays. It should be noted that the irradiation face 22 of the casing 20 may be configured by the grid 24. In addition a case 30 for accommodating a microcomputer containing various circuits (described later) is disposed at one end side within the casing 20. It is also preferable to dispose a lead plate or the like at the irradiation face 22 side of the case 30 in order to avoid the various circuits within the case 30 being damaged during irradiation with X-rays.

As shown in FIG. 3A and FIG. 3B, a casing 94 of the image reading device 84 is formed in a rectangular shape, with one portion thereof beveled off at an angle, and an operation panel 130 is attached to the sloping face of the casing 94. An insertion groove 172 is formed in the top face of the casing 94 (see FIG. 4A to FIG. 4C). The insertion groove 172 is formed with an opening section of a rectangular shape, and of a size into which it is possible to insert the casing 20 of the electronic cassette 12. When image data is to be read from the electronic cassette 12 by the image reading device 84, the casing 20 of the electronic cassette 12 is inserted into the insertion groove 172 of the image reading device 84 whilst in a state in which the end face of the casing 20 at the case 30 disposed side (in the present exemplary embodiment this side face is referred to as "bottom face 20A") faces downwards. The bottom face 20A in the casing 20 of the electronic cassette 12 contacts a bottom face 172A of the insertion groove 172 (see FIG. 6A), and the electronic cassette 12 is held in a state in which a portion at the bottom face 20A side of the casing 20 is inserted within the insertion groove 172, as shown in FIG. 3B.

Figure 4A:
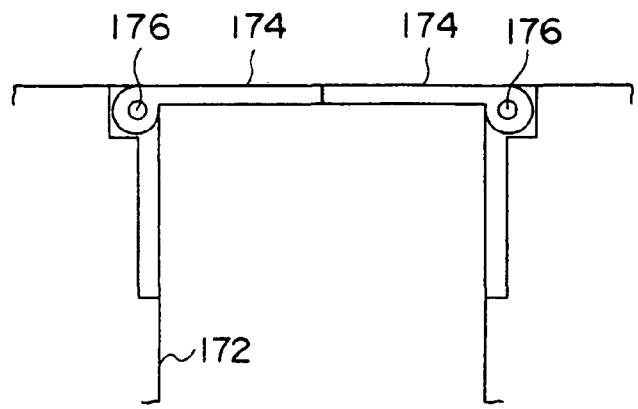
FIG. 4A to FIG. 4C are side views showing an opening section of an insertion groove of an image reading device.
Figure 4B:
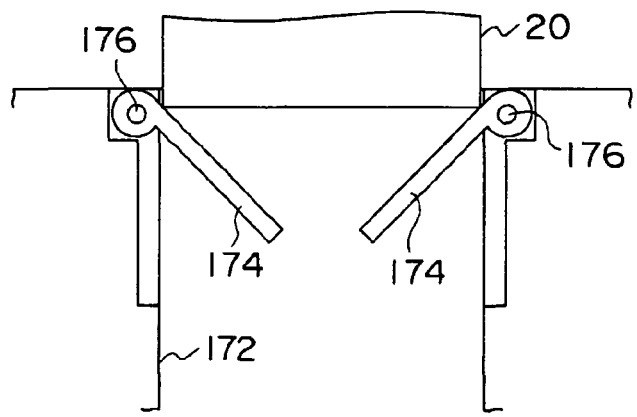
Figure 4C:
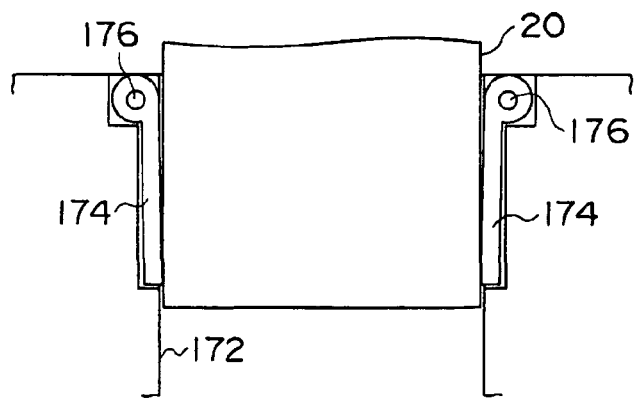

The opening section of the insertion groove 172 is also provided with a pair of elongated lid portions 174. The lid portions 174 are rotatably supported to the casing 94 through rotation shafts 176, as shown in FIG. 4A to 4C, and the lid portions 174 are held by biasing force from non-illustrated biasing means so as to close off the opening section of the insertion groove 172 in a closed position (see FIG. 4A). When the casing 20 of the electronic cassette 12 is being inserted into the insertion groove 172, corner contact portions of the bottom face 20A of the casing 20 contact the lid portions 174, and, as the casing 20 continues to move downward, the lid portions 174 are rotated against biasing force of the biasing means in the direction to open the opening section of the insertion groove 172 due to being pressed by the corner portions of the casing 20, as shown in FIG. 4B. When the casing 20 has moved even further downward, the lid portions 174 are completely moved out of the way from the insertion groove 172, as shown in FIG. 4C, and the casing 20 can be inserted within the insertion groove 172 up to the position of contact of the bottom face 20A of the casing 20 with the bottom face 172A of the insertion groove 172 (the communication enabled position).

Figure 5A:
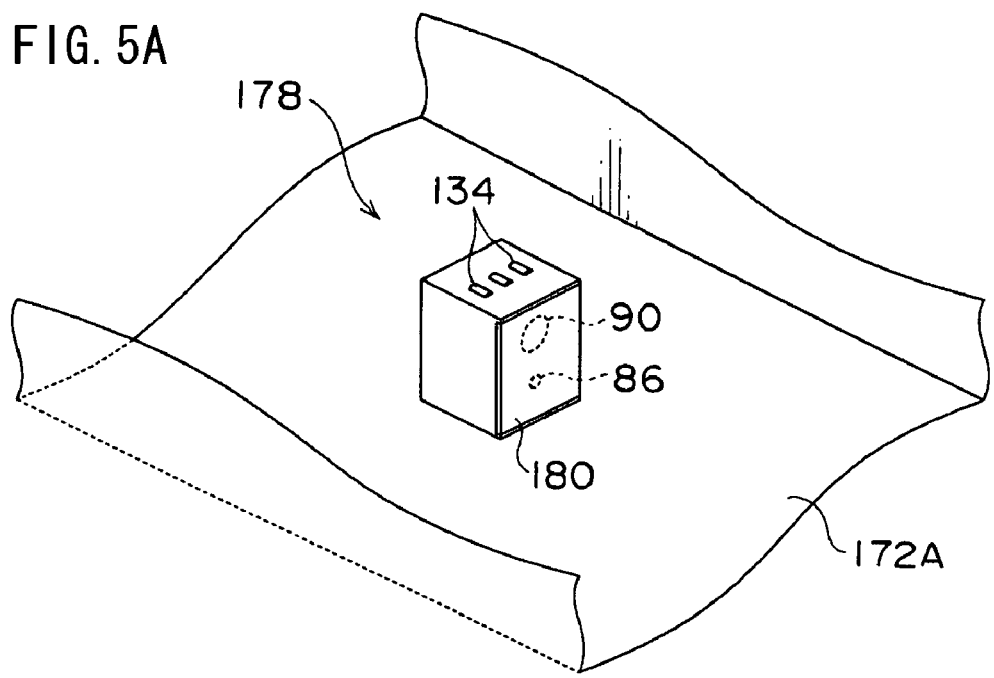
FIG. 5A is a perspective view showing a protrusion portion provided to an insertion groove of a image reading device.
Figure 5B:
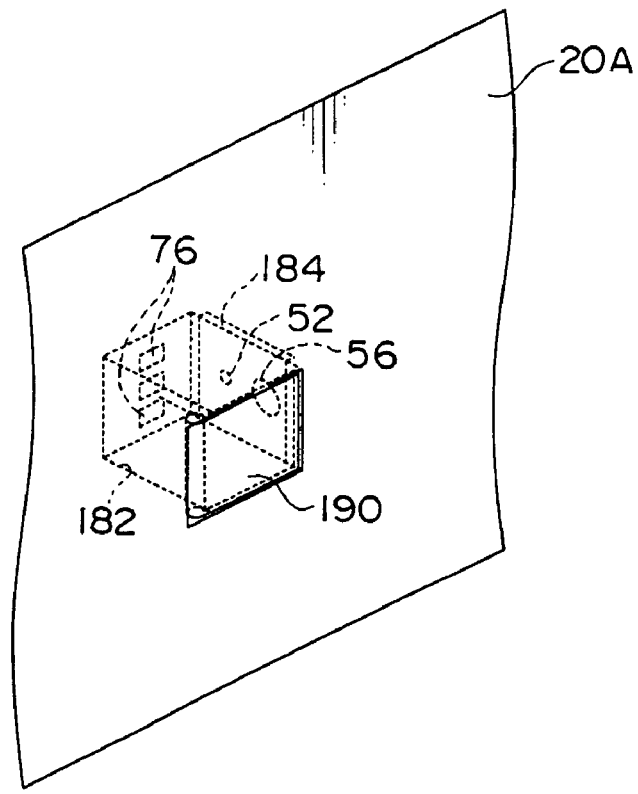
FIG. 5B is a perspective view showing a groove portion into which a protrusion portion provided to a casing of an electronic cassette is inserted.

There is also a protrusion portion 178 provided so as to protrude upwards from the bottom face 172A of the insertion groove 172 of the image reading device 84, as shown in FIG. 5A, and there is a groove 182 with a rectangular opening section provided in the bottom face 20A in the casing 20 of the electronic cassette 12, as shown in FIG. 5B. The groove 182 is of a size such that the protrusion portion 178 intrudes therein when the casing 20 of the electronic cassette 12 has been inserted within the insertion groove 172 up to the communication enabled position.

The image reading device 84 according to the present exemplary embodiment has functionality for carrying out wireless communication with the electronic cassette 12 using laser light, and, as shown in FIG. 6A, is provided with an LD 86 as a laser light source within the protrusion portion 178, and with a PD 90 for detection of laser light incident from outside. A transparent member 180 is adhered to a specific side face of the four side faces of the protrusion portion 178, and laser light emitted from the LD 86 is transmitted through the transparent member 180 and emitted out of the transparent member 180. The PD 90 is positioned within the protrusion portion 178 such that the laser light transmitted through the transparent member 180 is incident thereon (in FIG. 5A the transmission position on the transparent member 180 of the emitted laser light from the LD 86 is allocated the reference numeral "86", and the transmission position of the laser light to the PD 90 on the transparent member 180 is allocated the reference numeral "90"). Plural individual electrical contacts 134 (for example 3 or more electrical contacts) are provided to the top face of the protrusion portion 178.

The electronic cassette 12 according to the present exemplary embodiment is also provided with functionality for carrying out wireless communication with the image reading device 84, and, as shown in FIG. 6B, is provided with an LD 52 as a laser light source on the side face of the groove 182, and with a PD 56 for detection of laser light incident from outside. A transparent member 184 of a plate shape as with the protrusion portion 178 is adhered to a specific side face of the four side faces of the groove 182, the specific side face that faces the side face of the protrusion portion 178 to which the transparent member 180 has been adhered when the casing 20 of the electronic cassette 12 is in the inserted state within the insertion groove 172 up to the communication enabled position. Laser light emitted from the LD 52 is transmitted through the transparent member 184 and emitted out of the transparent member 184. The PD 56 is provided at a particular position on the side of groove 182 such that the laser light transmitted through the transparent member 184 is incident thereon (in FIG. 5B the transmission position on the transparent member 184 of the emitted laser light from the LD 52 is allocated the reference numeral "52", and the transmission position of the laser light to the PD 56 on the transparent member 184 is allocated the reference numeral "56"). The same plural number of electrical contacts 76 as the number individual electrical contacts 134 are provided to the bottom face of the groove 182, in order to contact the electrical contacts 134 when the casing 20 of the electronic cassette 12 is inserted within the insertion groove 172 and the protrusion portion 178 intrudes within the groove 182.

Thereby, when the casing 20 of the electronic cassette 12 is inserted within the insertion groove 172 up to the communication enabled position and the protrusion portion 178 intrudes within the groove 182, as shown in FIG. 6D, a state (a state in which wireless communication is possible by laser light) is arrived at in which the LD 52 of the electronic cassette 12 faces the PD 90 of the image reading device 84, and the LD 86 of the image reading device 84 faces the PD 56 of the electronic cassette 12, with the transparent members 180, 184 interposed therebetween. In this state the individual electrical contacts 134 contact the respective individual electrical contacts 76, and a conducting state is arrived at between the individual electrical contacts 134 and the individual electrical contacts 76.

The emission direction of laser light of the LD 86 of the image reading device 84 is also angled with respect to the open face of the insertion groove 172 and the bottom face 172A, or more precisely the direction is adjusted such that for laser light emitted from the LD 86 along a light path 186 (see FIG. 6A), the distance from the light path 186 to the opening section of the insertion groove 172 increases (the distance to the bottom face 172A decreases) with the distance to the LD 86. The PD 56 of the electronic cassette 12 is disposed at a slight angle to correspond to the emission direction of the laser light from the LD 86 described above. The emission direction of laser light from the LD 52 of the electronic cassette 12 is also angled with respect to the open face of the groove 182, or more precisely the direction is adjusted such that for laser light emitted from the LD 52 along a light path 188 (see FIG. 6B), the distance from the light path 188 to the opening section of the groove 182 increases with distance to the LD 52. The PD 90 of the image reading device 84 is disposed at a slight angle to correspond to the emission direction of the laser light from the LD 52.

In order to give high speed communication between the electronic cassette 12 and the image reading device 84 the LDs 52, 86 are preferably LDs emitting laser light with a wavelength in the infrared region, and the PDs 56, 90 are preferably PDs sensitive to wavelengths in the infrared region.

There is a lid portion 190 provided to the opening section of the groove 182, as shown in FIG. 6B. The lid portion 190 is rotatably supported by the casing 20 through a rotational shaft 192, and is held in a closed position (see FIG. 6B) by biasing force of a non-illustrated biasing means so as to close of the opening section of the groove 182. When the protrusion portion 178 is being inserted into the groove 182, corner portions of the protrusion portion 178 contact the lid portion 190, and, as the protrusion portion 178 continues to move downward, the lid portion 190 is rotated against biasing force of the biasing means in the direction to open the opening section of the groove 182, due to being pressed by the corner portions of the protrusion portion 178, as shown in FIG. 6C. When the casing 20 has moved even further downward, the lid portion 190 is completely moved out of the way from the groove 182, as shown in FIG. 6D, and the protrusion portion 178 can be inserted within the groove 182 up to the position where the individual electrical contacts 134 contact the individual electrical contacts 76.

Nearly all of the inside walls of the insertion groove 172 of the image reading device 84, except for in the portions of the walls where the protrusion portion 178 is provided, are covered in a diffusing material 194 capable of diffusing reflected light of the irradiated laser light by variously reflecting the irradiated laser light in multiple mutually different directions. As the diffusing material 194, for example, the surface can be applied with a member surface profiled such that, within miniature regions of surface area of that of the irradiated region when laser light is irradiated or a smaller surface area, there are plural portions present which each have mutually different reflection directions to irradiated light. Irradiated laser light on the diffusing material 194 can thereby be diffused with certainty. Most preferable as the diffusing material is a material surface profiled such that there are uniformly distributed semi-spherical shaped protrusion portions on the surface of a size $\frac{1}{10}$ the wavelength of the laser light irradiated or smaller. The dependency on incident angle can be reduced by forming the individual semi-spherical shaped protrusion portions in the above manner, and by making the individual protrusion portions of a size $\frac{1}{10}$ the wavelength of the laser light irradiated or smaller, Rayleigh scattering occurs and even more pronounced diffusion of the irradiated laser light can be achieved.

The above diffusing material is also provided to nearly all of the internal walls of the groove 182, other than the portions where the transparent member 184 is provided. The faces of the lid portions 174 facing inwards towards the insertion groove 172 in the state in which the lid portions 174 are held in the closed position (see FIG. 4A), and the faces of the lid portion 190 facing outwards out of the casing 20 in the state in which the lid portion 190 is held in the closed position (see FIG. 6B), are also provided with the above diffusing material.

An absorbing material for absorbing most of the laser light irradiated thereon (for example a selective wavelength optical filter (more precisely, a light absorbing filter with light absorbance to the wavelength region of the irradiated laser light), a furry material or porous material, a member with a black surface, etc.) may be provided in place of the diffusing material 194. There are, for example, commercially available light absorbing filters configured with light absorbing substances dispersed within glass and having a transmittance of about 20% to light of 1300 nm wavelength, with respect to laser light that is suitably applied for communication between the electronic cassette 12 and the image reading device 84. It is possible to achieve a light absorbing material capable of suppressing reflected light to a few % of the incident light by using such a light absorbing filter and giving an anti-reflection coating treatment or the like to the surface of such a light absorbing filter to suppress any surface light reflection.

Explanation will now be given of the configuration of an electrical system of the electronic cassette 12 and the image reading device 84. The radiation detector 26 of the electronic cassette 12 is configured with a TFT active matrix board 32, as shown in FIG. 1, layered thereon with a photoelectric conversion layer for absorbing radiation and converting it into charge. The photoelectric conversion layer is formed with, for example, non-crystalline a-Se (amorphous selenium), of which main component is selenium (for example contained at a proportion of 50% or above). When radiation is irradiated onto the photoelectric conversion layer, the photoelectric conversion layer converts irradiated radiation into charge by generating a charge (electron-hole pair) within the layer of an amount of electric charge in accordance with the amount of irradiated radiation. Disposed in a matrix shape on the TFT active matrix board 32 are plural individual pixel portions 40. Each of the pixel portions 40 is provided with an individual storage capacitor 34 for accumulating charge generated in the photoelectric conversion layer, and a TFT 36 for reading out the charge accumulated in the storage capacitor 34 (in FIG. 1 the photoelectric conversion layer corresponding to each of the individual pixel portions 40 is shown pictorially as photoelectric conversion portions 38). The charge generated in the photoelectric conversion layer, by irradiation of the electronic cassette 12 with radiation, is accumulated in the respective storage capacitor 34 of the individual pixel portions 40. In this manner, the image-information carried by radiation that is irradiated onto the electronic cassette 12 is converted into charge information, and held in the radiation detector 26.

The TFT active matrix board 32 is provided with plural gate lines 42 extending along a fixed direction (row direction) for switching on and off the TFT 36 of the individual pixel portions 40, and is provided with plural data lines 44 extending in a direction perpendicular to the gate lines 42 (column direction) for reading out accumulated charge from the storage capacitors 34 through the TFTs 36 that are switched on. Individual gate lines 42 are connected to a gate line driver 46, and individual data lines 44 are connected to a signal processing unit 48. When charge has been accumulated in the storage capacitor 34 of individual pixel portions 40, the TFTs 36 of the individual pixels 40 are switched on in sequence of single row units by a signal supplied from the gate line driver 46 through the gate lines 42, and the charge that has been accumulated in the storage capacitor 34 of the pixel portions 40 for which the TFT 36 is on, is transmitted as a charge signal through the data lines 44 and input to the signal processing unit 48. The charge that has been accumulated in the storage capacitors 34 of individual pixel portions 40 is consequently read out in sequence in single row units.

While not illustrated in the figures, the signal processing unit 48 is provided with a amplifier and a sample and hold circuit for each of the individual data lines 44. After the charge signal transmitted through the data line 44 has been amplified by the amplifier, it is then held in the sample and hold circuit. An A/D convertor is connected in sequence to the output side of the sample and hold circuits, and the charge signals held in the individual sample and hold circuits are input in sequence (serially) into a multiplexer, and converted into digital image data by the A/D convertor. There is an image memory 50 connected to the signal processing unit 48, and image data output from the A/D convertor of the signal processing unit 48 is stored in sequence in the image memory 50. The image memory 50 has a capacity capable of storing image data equivalent to plural films, and each time radiographic imaging is carried out the image data obtained by imaging is stored in sequence in the image memory 50.

The LD 52 of the previously described electronic cassette 12 is connected to a communications controller 72 through a modulation unit 68. The communications controller 72 is realized by a microcomputer, and when information is being transmitted to the image reading device 84, the communications controller 72 outputs transmission information to the modulation unit 68, and also instructs the modulation unit 68 to modulate the intensity of the laser light for emission from the LD 52. The modulation unit 68 modulates the laser light emitted from the LD 52 according to the transmission information that has been input with a specific modulation formula, and the modulation unit 68 controls driving of the LD 52 such that the intensity of the laser light emitted from the LD 52 matches the instructed intensity. The laser light modulated according to the transmission information is thereby emitted from the LD 52 at the intensity instructed by the communications controller 72.

The PD 56 of the previously described electronic cassette 12 is connected to the communications controller 72 through a demodulation unit 70. Laser light from outside is received by the PD 56, and when a received light amount signal according to the received light amount of the laser light is input to the demodulation unit 70 from the PD 56, the demodulation unit 70, based on the input received light amount signal, demodulates the information carried on the received light of the laser light with a specific demodulation formula (the information sent from the opposing device in the communication). The demodulated information is output by the demodulation unit 70 to the communications controller 72. While not shown in FIG. 6B, there is a lens 54 disposed at the emission side of the LD 52, and there is a lens 58 disposed at the incident light side of the PD 56.

A main power source unit 80 is provided to the electronic cassette 12, and the main power source unit 80 supplies power to the various circuits and various elements (the gate line driver 46, the signal processing unit 48, the image memory 50, microcomputer(s) with the functionality of the communications controller 72, the modulation unit 68, the PD 56, the demodulation unit 70 etc.) except for the LD 52, and the various circuits and various elements except for the LD 52 are operated by power supplied from the main power source unit 80. The main power source unit 80 is preferably configured by an internal battery (a rechargeable battery) so that the portability of the electronic cassette 12 is not compromised, with supply of power to the various circuits and elements from a charged battery. However disposable batteries may be used as the battery, or a configuration may be made with constant connection to a commercial power source, with rectification and voltage transformation of the power supplied from the commercial power source before supplying power to the various circuits and elements.

There is also a LD power supply unit 74 provided to the electronic cassette 12. The LD power supply unit 74 is connected to the electrical contacts 76, and power is supplied to the LD power supply unit 74 from the image reading device 84 through the electrical contacts 76. The LD power supply unit 74 operates to supply power that has been supplied from the image reading device 84 through the electrical contacts 76 to the LD 52, and to also to supply a portion of the power that has been supplied from the image reading device 84 back to the image reading device 84 (to a later described LD power supply unit 144) through the electrical contacts 76. The LD 52 of the electronic cassette 12 is operated by power supplied from the LD power supply unit 74. During intervals in which the LD power supply unit 74 is supplied with power from the image reading device 84 through the electrical contacts 76, repeated detection is made of a physical amount representing the state of power supplied from the image reading device 84, such as the maximum value of the voltage of the supplied power or the average voltage during a unit of time of the supplied power. If there is a change in the detected physical amount of a specific value or greater, or if the proportional change (rate of change) thereof is a specific value or greater, then determination is made that there has been a change in the state of power supply (in most cases a worsening), and this determination is notified to the communications controller 72.

The LD 86 of the image reading device 84 is connected to a communications controller 108 through a modulation unit 104. The communications controller 108 is realized by a microcomputer, and when information is being transmitted to the electronic cassette 12, the communications controller 108 outputs transmission information to the modulation unit 104, and also instructs the modulation unit 104 to modulate the intensity of the laser light for emission from the LD 86. The modulation unit 104 modulates the laser light emitted from the LD 86 with a specific modulation formula according to the transmission information that has been input, and the modulation unit 104 controls driving of the LD 86 such that the intensity of the laser light emitted from the LD 86 matches the instructed intensity. Laser light modulated according to the transmission information is thereby emitted from the LD 86 at the intensity instructed by the communications controller 108.

The PD 90 of the image reading device 84 is connected to the communications controller 108 through a demodulation unit 106. Light is received from outside by the PD 90, and when a received light amount signal according to the received light amount of the laser light is input to the demodulation unit 106 from the PD 90, the demodulation unit 106, based on the input received light amount signal, demodulates the information carried on the received laser light with a specific demodulation formula (the information sent from the opposing device in the communication). The demodulated information is output by the demodulation unit 106 to the communications controller 108. While not shown in FIG. 6A, there is a lens 88 disposed at the emission side of the LD 86, and there is a lens 92 disposed at the incident light side of the PD 90.

An operation unit 116 is connected to the communications controller 108. The operation unit 116, as shown in FIG. 3A and FIG. 3B, is configured to include a display 118, provided on the operation panel 130 of the casing 94 and capable of displaying given information including various messages, and a keyboard 120 of plural keys, also provided on the casing 94. Various instructions and information are input to the communications controller 108 by a user operating the keyboard 120, and display of information on the display 118 is controlled by the communications controller 108.

An image memory 124 is connected through an image processing unit 112 to the communications controller 108. In communication between the electronic cassette 12 and the image reading device 84, as will be described later, image data stored in the image memory 50 of the electronic cassette 12 is transferred to the image reading device 84, and the image processing unit 112 carries out various image processing (for example various types of correction processing such as removal of noise superimposed on the image data, correcting the variation of the image data by pixel caused by variation in the properties of each of the pixel portions 40 of the radiation detector 26, etc.) on the image data that has been received from the electronic cassette 12 and output in sequence from the communications controller 108. The image data that has been subjected to the various types of image processing is stored in the image memory 124.

An output control unit 126 is connected to the image memory 124. When outputting image data stored in the image memory 124 to an external device, the output control unit 126 reads out the image data from the image memory 124 and controls the output of the image data to the external device. A display 128 is shown in FIG. 1 as a typical example of an external device, and when the external device is the display 128 an image represented by the image data stored in the image memory 124 (a radiographic image) is displayed on the display 128 by the output control unit 126. Examples of other external devices, other than the display 128, include for example printing devices for printing an image represented by the image data on a sheet printing medium, information recording devices for recording image data on a CD-R or other known recording medium, communication devices for transmitting image data to an information processing device connected through a communications network, etc.

A power source unit 142 is provided to the image reading device 84. The power source unit 142 is continuously connected to a commercial power supply, and rectifies and transforms the voltage of the power supplied from the commercial power source before supplying power to the various circuits and elements within the image reading device 84 except for the LD 86 (the demodulation unit 106, the modulation unit 104, the PD 90, the communications controller 108, the operation unit 116, the image processing unit 112, the image memory 124, the output control unit 126 etc.). The various circuits and various elements of the electronic cassette 12 except for the LD 52 are operated by power supplied from the main power source unit 80. The power source unit 142 is also connected to the electrical contacts 134, as shown in FIG. 7A, and power is also supplied to the LD power supply unit 74 of the electronic cassette 12 when the electrical contacts 134 contact and are in electrical continuation with the electrical contacts 76.

An LD power supply unit 144 is provided to the image reading device 84. The LD power supply unit 144 is connected to the electrical contacts 134, as shown in FIG. 7A, and the LD power supply unit 144 operates when the electrical contacts 134 contact and are in electrical continuation with the electrical contacts 76, electrical power supplied from the LD power supply unit 74 of the electronic cassette 12 is supplied through the electrical contacts 76, 134, and the LD power supply unit 144 supplies to the LD 86 electrical power that has been supplied from the electronic cassette 12 through the electrical contacts 76, 134. The LD 86 of the image reading device 84 operates due to power supplied from the LD power supply unit 144. During intervals in which the LD power supply unit 144 is supplied with power from the image reading device 84 through the electrical contacts 134, repeated detection is carried out of a physical amount representing the state of power supplied from the image reading device 84, such as the maximum value of the voltage of the supplied power or the average voltage during a unit of time of the supplied power. If there is a change in the detected physical amount of a specific value or greater, or if the proportional change thereof is a specific value or greater, then determination is made that there has been a change in the state of power supply (in most cases a worsening), and this determination is notified to the communications controller 108.

Figure 7A:
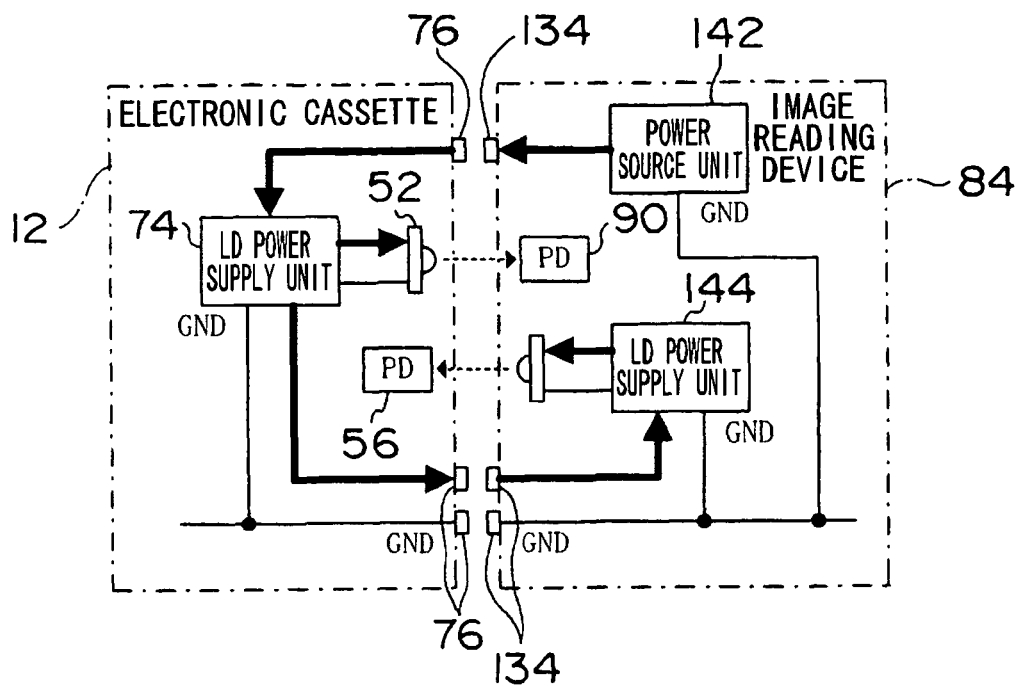
FIG. 7A to FIG. 7C are schematic diagrams showing power supply between an electronic cassette and an image reading device.

There are 3 individual electrical contacts 76 and electrical contacts 134 provided in the present exemplary embodiment, and, as shown in FIG. 7A, one of these electrical contacts is used for power supply to the LD power supply unit 74 of the electronic cassette 12 from the power source unit 142 of the image reading device 84, another one of these electrical contacts is used for power supply to the LD power supply unit 144 of the image reading device 84 from the LD power supply unit 74 of the electronic cassette 12, and the remaining electrical contact is used for connecting to the ground line GND of the electronic cassette 12 and to the ground line GND of the image reading device 84.

The electronic cassette 12 and the image reading device 84 each correspond to the electronic device of the present invention, the LD 52 of the electronic cassette 12 and the LD 86 of the image reading device 84 corresponds to the first emission unit of the present invention, the modulation unit 68 of the electronic cassette 12 and the modulation unit 104 of the image reading device 84 correspond to the first modulating unit of the present invention, the LD power supply unit 74 of the electronic cassette 12 and the LD power supply unit 144 of the image reading device 84 correspond to the first electrical supply unit of the present invention, respectively.

If the electronic cassette 12 is considered as the electronic device of the present invention, then: the electrical contact 76 used for supplying power to the LD power supply unit 74 of the electronic cassette 12 from the power source unit 142 of the image reading device 84 corresponds to the first electrical contact of the present invention; the electrical contact 134 used for supplying power to the LD power supply unit 74 of the electronic cassette 12 from the power source unit 142 of the image reading device 84 corresponds to the second electrical contact of the present invention; the electrical contact 76 used for supplying power to the LD power supply unit 144 of the image reading device 84 from the LD power supply unit 74 of the electronic cassette 12 corresponds to the third electrical contact of the present invention; the electrical contact 134 used for supplying power to the LD power supply unit 144 of the image reading device 84 from the LD power supply unit 74 of the electronic cassette 12 corresponds to the fourth electrical contact of the present invention; the image reading device 84 corresponds to the opposing device of the present invention; the LD 86 of the image reading device 84 corresponds to the second emission unit of the present invention; the modulation unit 104 of the image reading device 84 corresponds to the second modulating unit of the present invention; the power source unit 142 of the image reading device 84 corresponds to the second electrical supply unit of the present invention; and the LD power supply unit 144 of the image reading device 84 corresponds to the third electrical supply unit of the present invention.

However, if the image reading device 84 is considered as the electronic device of the present invention, then: the electrical contact 134 used for supplying power to the LD power supply unit 144 of the image reading device 84 from the LD power supply unit 74 of the electronic cassette 12 corresponds to the first electrical contact of the present invention; the electrical contact 76 used for supplying power to the LD power supply unit 144 of the image reading device 84 from the LD power supply unit 74 of the electronic cassette 12 corresponds to the second electrical contact of the present invention; and the electronic cassette 12 corresponds to the opposing device.

Explanation will now be given of the operation of the present exemplary embodiment. The LD 52 of the electronic cassette 12 is operated by power supplied from the LD power supply unit 74, and the LD power supply unit 74 operates by power supplied from the power source unit 142 of the image reading device 84 through the electrical contacts 76, as shown in FIG. 7A. This power supply to the LD power supply unit 74, as described above, is possible by contact and electrical continuation of the electrical contacts 76 and the electrical contacts 134 when the casing 20 of the electronic cassette 12 is inserted up to the position where the bottom face 20A of the casing 20 contacts the bottom face 172A of the insertion groove 172 of the image reading device 84 (the communication enabled position). Consequently, if the casing 20 of the electronic cassette 12 is not in the inserted state in the insertion groove 172 of the image reading device 84 then the power supply to the LD 52 of the electronic cassette 12 is cut off, and unintentional emission of laser light from the LD 52 of the electronic cassette 12 can be prevented.

The LD 86 of the image reading device 84 is operated by power supplied from the LD power supply unit 144, and LD power supply unit 144 operates by power supplied from the LD power supply unit 74 of the electronic cassette 12 through the electrical contacts 134 as shown in FIG. 7A. This power supply to the LD power supply unit 144, as described above, is possible by contact and electrical continuation of the electrical contacts 76 and the electrical contacts 134 when the casing 20 of the electronic cassette 12 is inserted up to the position where the bottom face 20A of the casing 20 contacts the bottom face 172A of the insertion groove 172 of the image reading device 84 (the communication enabled position). Consequently, if the casing 20 of the electronic cassette 12 is not in the inserted state in the insertion groove 172 of the image reading device 84, then the power supply to the LD 86 of the image reading device 84 is cut, and unintentional emission of laser light from the LD 86 of the image reading device 84 can be prevented.

In addition, if a shock or the like is imparted to the casing 20 of the electronic cassette 12, the possibility cannot be completely ignored of a portion of the lines of each of the various circuits of the electronic cassette 12 shorting, and thereby supplying power to the LD 52 regardless of whether or not the casing 20 of the electronic cassette 12 is in the inserted state within the insertion groove 172 of the image reading device 84. However, with respect to this, in the present exemplary embodiment the groove 182 (recessed portion) is provided to the casing 20 of the electronic cassette 12, and the LD 52 is disposed so as to emit laser light from a side face of the groove 182. It is clear from reference to the light path 188 shown in FIG. 6B that the LD 52 is disposed so as to emit laser light within the groove 182, so that at least the direct laser light from the LD 52 (laser light before being irradiated onto another member and reflected therefrom) is emitted in a direction that does not face out from the groove 182. Therefore, even if the casing 20 of the electronic cassette 12 is not inserted within the insertion groove 172 of the image reading device 84, then even if it were supposed that laser light was emitted from the LD 52, the direct light of comparatively large light amount can be prevented from being emitted from the groove 182.

In addition, in a state in which the casing 20 is not inserted into the insertion groove 172, the opening section of the groove 182 of the casing 20 of the electronic cassette 12 is closed off by the lid portion 190. Consequently, in the state in which the casing 20 of the electronic cassette 12 is not inserted into the insertion groove 172 of the image reading device 84, even if it were supposed that laser light was emitted from the LD 52, leaking of indirect light (diffused light after being irradiated onto another member and reflected therefrom) of comparatively small light amount can be prevented from being emitted from the groove 182. A secondary effect is also obtained in that intrusion of dust within the groove 182 can also be suppressed by the provision of the lid portion 190.

In addition, the lid portion 190 is held in the closed position closing off the opening section of the groove 182 due to biasing force from biasing means, so if an external force of some sort is applied so as to rotate the lid portion 190 in the direction to open the opening section of the groove 182, the laser light emitted from the LD 52 is reflected by the rotated lid portion 190, and so there is also a possibility of the laser light leaking from the groove 182. However, with respect to this, in the present exemplary embodiment there is diffusing material provided over nearly all of the internal wall faces of the groove 182 except for the portions where the transparent member 184 is provided, and diffusing material is also provided to the face of the lid portion 190 facing outwards out of the casing 20 in the state in which the lid portion 190 is held in the closed position (the face which possibly might be irradiated with laser light in the above described rotated state). Consequently, when the casing 20 of the electronic cassette 12 is not in the inserted state into the insertion groove 172 of the image reading device 84, supposing the LD 52 were to emit laser light, then even if the lid portion 190 were to have been rotated by application of an external force of some sort, the laser light amount leaking from the groove 182 can be reduced, and safety can be ensured. It should be noted that a similar effect could be expected if an absorbing material was provided instead of the above diffusing material.

In addition, if a shock or the like is imparted to the casing 94 of the image reading device 84, the possibility cannot be completely ignored of a portion of the lines of each of the various circuits of the image reading device 84 shorting, and thereby supplying power to the LD 86 regardless of whether or not the casing 20 of the electronic cassette 12 is in the inserted state within the insertion groove 172 of the image reading device 84. However, with respect to this, in the present exemplary embodiment the groove 172 (recessed portion) is provided to the casing 94 of the image reading device 84, and the LD 86 is disposed so as to emit laser light from a side face of the protrusion portion 178 protruding up from the insertion groove 172. It is clear from reference to the light path 186 shown in FIG. 6A that the LD 86 is disposed so as to emit laser light into the groove 172, so that at least the direct laser light from the LD 86 (laser light before being irradiated onto another member and reflected therefrom) is emitted in a direction that does not face out from the groove 172. Therefore, even if the casing 20 of the electronic cassette 12 is not inserted within the insertion groove 172 of the image reading device 84, then even if it were supposed that laser light was emitted from the LD 86, the direct light of comparatively large light amount can be prevented from being emitted from the groove 172.

In the state in which the casing 20 is not inserted into the insertion groove 172 the insertion groove 172 of the casing 94 of the image reading device 84 is closed off by the lid portions 174. Therefore, in the state in which the casing 20 of the electronic cassette 12 is not inserted within the insertion groove 172 of the image reading device 84, even if it was supposed that light were to be emitted from the LD 86, the indirect light of comparatively small laser light amount (diffused light after being irradiated onto another member and reflected therefrom) can be prevented from leaking out from the insertion groove 172. A secondary effect is also obtained in that intrusion of dust within the groove 172 can also be suppressed by the provision of the lid portions 174.

The lid portions 174 are also held in the closed position closing off the opening section of the insertion groove 172 by biasing force from biasing means, and there is a possibility of laser light leaking out from the insertion groove 172, if an external force of some sort were to be applied to the lid portions 174 to rotate them in the direction of opening the opening section of the insertion groove 172. However, there is diffusing material provided over almost all of the faces of the internal wall faces of the insertion groove 172, except for the portions provided with the protrusion portion 178, and so in the state in which the casing 20 of the electronic cassette 12 is inserted into the insertion groove 172 of the image reading device 84, if it were to be supposed that laser light was emitted from the LD 86, and furthermore even if the lid portions 174 were rotated by an imparted external force of some sort, the laser light amount leaking from the insertion groove 172 can be reduced, and safety can be ensured. It should be noted that a similar effect could be expected if an absorbing material was provided instead of the above diffusing material.

If a user desires to display as an image on the display 128 image data from capturing a radiographic image stored in the image memory 50 of the electronic cassette 12, the user first grips the casing 20 of the electronic cassette 12 on which the image data for read-out is stored so that the bottom face 20A faces downwards, and moves the casing 20 toward the space above the insertion groove 172 of the image reading device 84. Then, after inserting the bottom end portion of the casing 20 of the electronic cassette 12 (the portion on the bottom face 20A side) into the insertion groove 172 of the image reading device 84, the user carries out an operation of moving the casing 20 downward until the bottom face 20A of the casing 20 of the electronic cassette 12 contacts the bottom face 172A of the insertion groove 172.

Corner portions of the bottom face 20A of the casing 20 thereby contact and press the lid portions 174 and the lid portions 174 are rotated against biasing force of the biasing means in the direction to open the opening section of the insertion groove 172 and the bottom end portion of the casing 20 is insertable into the insertion groove 172. When a position is achieved near to contact of the bottom face 20A of the casing 20 with the bottom face 172A of the insertion groove 172, the lid portion 190 is contacted and pressed by the corner portions of the protrusion portion 178, and, as shown in FIG. 6C and FIG. 6D, the lid portion 190 is rotated in the direction to open the opening section of the groove 182 against biasing force of the non-illustrated biasing means, and the protrusion portion 178 of the casing 20 becomes insertable within the groove 182.

Thereby, the bottom face 20A of the casing 20 contacts the bottom face 172A of the insertion groove 172 and the communication enabled position is achieved (the state shown in FIG. 3B), to give a state in which the LD 52 of the electronic cassette 12 faces the PD 90 of the image reading device 84, and the LD 86 of the image reading device 84 faces the PD 56 of the electronic cassette 12, with the transparent members 180, 184 interposed therebetween (a laser light wireless communication enabled state). In this state the individual electrical contacts 134 contact the respective individual electrical contacts 76. Along with arriving at contact and electrical continuation between the individual electrical contacts 134 and the individual electrical contacts 76, power is supplied to the LD power supply unit 74 of the electronic cassette 12, from the power source unit 142 of the image reading device 84 through the electrical contacts 76, 134. The LD 52 of the electronic cassette 12 is thereby in a laser light emittable state. A portion of the power supplied to the LD power supply unit 74 from the power source unit 142 is supplied to the LD power supply unit 144 of the image reading device 84 through the electrical contacts 76, 134, and the LD 86 of the image reading device 84 is thereby also in a laser light emittable state.

After setting the electronic cassette 12 to the image reading device 84 (positioning in the communication enabled position), the user then operates the keyboard 120 of the operation unit 116 to instruct the image reading device 84 to read out the image data from the electronic cassette 12.

When instructed to read out the image data, the communications controller 108 of the image reading device 84 first causes a micro output laser light to be emitted from the LD 86 via the modulation unit 104. The micro output laser light emitted from the LD 86 is transmitted through the transparent members 180, 184 and is incident on the PD 56 of the electronic cassette 12. When the communications controller 72 of the electronic cassette 12 detects (senses) the laser light with the PD 56, the communications controller 72 causes a micro output laser light to be emitted from the LD 52 via the modulation unit 68. The micro output laser light emitted from the LD 52 is transmitted through the transparent members 180, 184 and is incident on the PD 90 of the image reading device 84.

When the laser light is detected (sensed) by the PD 90 of the image reading device 84, the micro output laser light emitted from the LD 86 of the image reading device 84 is detected (sensed) by the PD 56 of the electronic cassette 12, and the micro output laser light emitted from the LD 52 of the electronic cassette 12 is also detected (sensed) by the PD 90 of the image reading device 84. Determination can therefore be made that the relative position of the electronic cassette 12 and the image reading device 84 is the optimal positional relationship enabling communication, where the laser light emitted from the LD 86 is incident at the center, or in the vicinity of the center, of the light receiving face of the PD 56, and where also the laser light emitted from the LD 52 is incident at the center, or in the vicinity of the center, of the light receiving face of the PD 90.

Therefore, when the PD 90 detects (senses) the micro output laser light, the communications controller 108 of the image reading device 84 transmits specific information by laser light from the device itself (modulates laser light emitted from the LD of the device itself according to specific information) and also carries out opposing device confirmation processing for confirming whether or not the opposing device is a normal device by confirming the contents of information received by laser light from the opposing device (information obtained by demodulating the laser light emitted from the LD of the opposing device and received by the PD of the device itself). An example of the information transmitted by the electronic cassette 12 to the image reading device 84 in opposing device confirmation processing is a cassette ID or the like for discriminating between individual electronic cassettes 12. An example of information transmitted by the image reading device 84 to the electronic cassette 12 is information indicating that the device itself is an image reading device.

If determination is made in the above opposing device confirmation processing that the opposing device is not a normal device, the communications controller 108 of the image reading device 84 stops emission of the laser light from the LD 86, and carries out error processing, such as displaying an error message advising that the opposing device is not the normal device on the display 118. When determination is made in the opposing device confirmation processing that the opposing device is the normal device (electronic cassette 12) then the value for the laser light output from the LD 86 is set to the normal value and information requesting data transfer from the opposing device is transmitted by laser light to the opposing device.

When a data transfer request is received from the image reading device 84, the communications controller 72 of the electronic cassette 12, after setting the laser light output from the LD 52 to the normal value, reads out as image data from the image memory 50 image data which has not yet been transferred to the image reading device 84, and transmits by laser light the image data for transfer read out from the image memory 50 to the opposing device (the image reading device 84). When the image data transmitted by laser light from the electronic cassette 12 is received by the image reading device 84, the communications controller 108 of the image reading device 84 outputs the image data received from the opposing device (the electronic cassette 12) downstream (to the image processing unit 112 in the present exemplary embodiment). The image data received by the image reading device 84 thereby is subjected to various types of image processing by the image processing unit 112, and then stored in the image memory 124. The communications controller 108 of the image reading device 84 transmits by laser light a reply to the data receipt from the opposing device (the electronic cassette 12). When this reply is received by the electronic cassette 12, the communications controller 72 of the electronic cassette 12 reads out from the image memory 50 image data not yet transferred, and then once again carries out image data transmission of the read out data.

The above sequence is repeated up until there is no image data not yet transferred from the image memory 50 to the image reading device 84 left, and all of the not yet transferred image data stored in the image memory 50 has been transmitted (transferred) to the image reading device 84. When there is no image data left that has not yet been transferred from the image memory 50, the communications controller 72 of the electronic cassette 12 notifies the opposing device (the image reading device 84) that data transfer is complete, and emission of laser light from the LD 52 is stopped. On notification that data transfer is complete, the communications controller 108 of the image reading device 84 halts emission of laser light from the LD 86, and also displays a massage notifying that image data read out from the electronic cassette 12 has been completed on the display 118.

In cases where, during communication between the electronic cassette 12 and the image reading device 84 in the above manner, an external force is imparted to the casing 20 of the electronic cassette 12 and/or to the casing 94 of the image reading device 84, and there is a change to the contact state between the electrical contacts 76 and the electrical contacts 134 (for example a case in which the electrical contacts 76 and the electrical contacts 134 become only slightly in contact with each other, with a large increase in the contact resistance etc.), the power output of the LD power supply unit 74 and/or the power output of the LD power supply unit 144 changes, and this change in the state of power supply is detected by the LD power supply unit 74 and/or by the LD power supply unit 144.

If a change in the power supply state is detected by the LD power supply unit 74, the detected change in the power supply state is notified to the communications controller 72, and in such a case the communications controller 72 immediately stops laser light emission from the LD 52. Stopping laser light emission from the LD 52 can be accomplished, for example, by stopping power supply from the LD power supply unit 74 to the LD 52, or by stopping output of the signal to the LD 52 from the modulation unit 68. In this manner, if an external force is imparted to the casing 20 of the electronic cassette 12 and/or to the casing 94 of the image reading device 84, even if this force is sufficiently large an external force to cause the electronic cassette 12 to come out from the insertion groove 172 of the image reading device 84 or the like, the emission of laser light from the LD 52 can be stopped before the electronic cassette 12 actually comes out from the insertion groove 172, and laser light from the LD 52 leaking out from the casing 20 (outside of the groove 182) can be prevented before it occurs.

When a change in the power supply state is detected by the LD power supply unit 144, this detected change in the power supply state is notified to the communications controller 108. In such cases the communications controller 72 immediately stops emission of laser light from the LD 86 and also carries out error processing to display an error message on the display 118. When stopping emission of laser light from the LD 86 this may also be performed, for example, by stopping power supply to the LD 86 from the LD power supply unit 144, or stopping signal output to the LD 86 from the modulation unit 104. In this manner, if an external force is imparted to the casing 20 of the electronic cassette 12 and/or to the casing 94 of the image reading device 84, even if this force is sufficiently large an external force to cause the electronic cassette 12 to come out from the insertion groove 172 of the image reading device 84, the emission of laser light from the LD 86 can be stopped before the electronic cassette 12 actually comes out from the insertion groove 172, and laser light from the LD 86 leaking out from the insertion groove 172 can be prevented before it occurs. Note that the above processing by the communications controllers 72, 108 correspond to that of the control unit of the present invention.

During communication between the electronic cassette 12 and the image reading device 84, even if the above described stopping of emission of laser light based on a change in power supply state is not achieved in time due to the casing 20 of the electronic cassette 12 rapidly coming apart from the communication enabled position, the contact and electrical continuation between the electrical contacts 76, 134 is broken at the same time as the casing 20 of the electronic cassette 12 comes apart, and power supply is stopped from the power source unit 142 of the image reading device 84 to the LD power supply unit 74 of the electronic cassette 12, and power supply is stopped from the LD power supply unit 74 of the electronic cassette 12 to the LD power supply unit 144 of the image reading device 84. Consequently power supply to the LDs 52, 86 is stopped, and emission of laser light from the LDs 52, 86 is stopped. In addition, if during communication with the electronic cassette 12 the casing 20 of the electronic cassette 12 comes apart from the communication enabled position, the cessation of power supply is notified from the LD power supply unit 144 to the communications controller 108, and error processing is carried out to display an error message on the display 118.

Figure 7B:
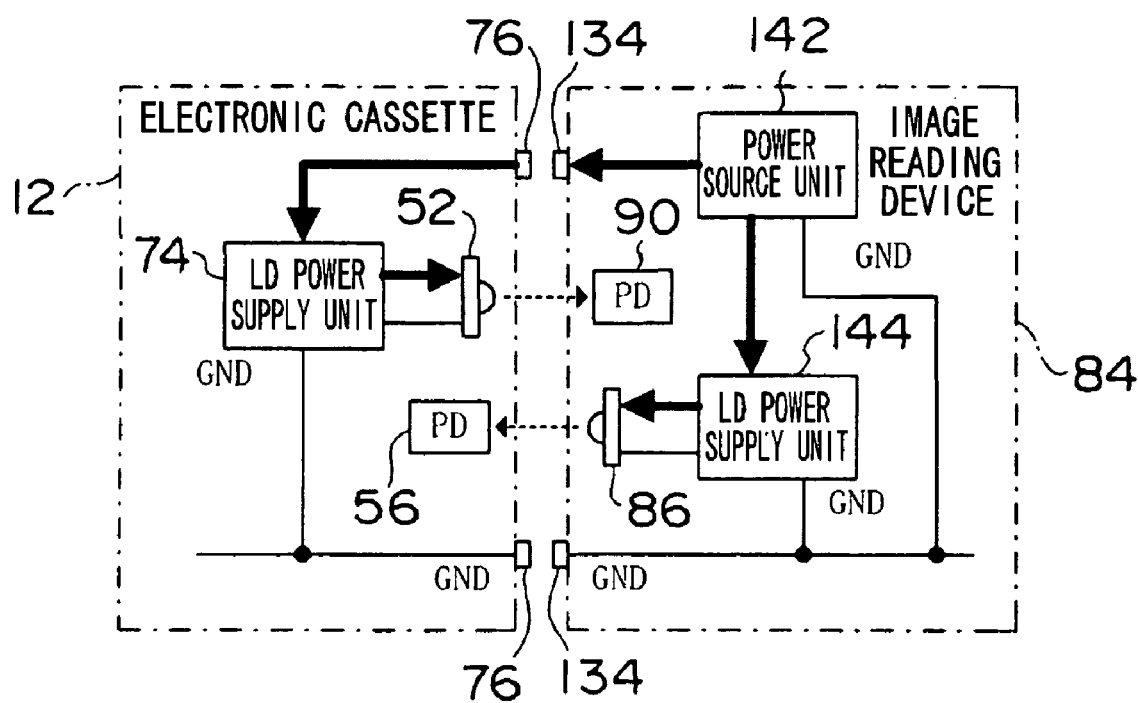
Figure 7C:
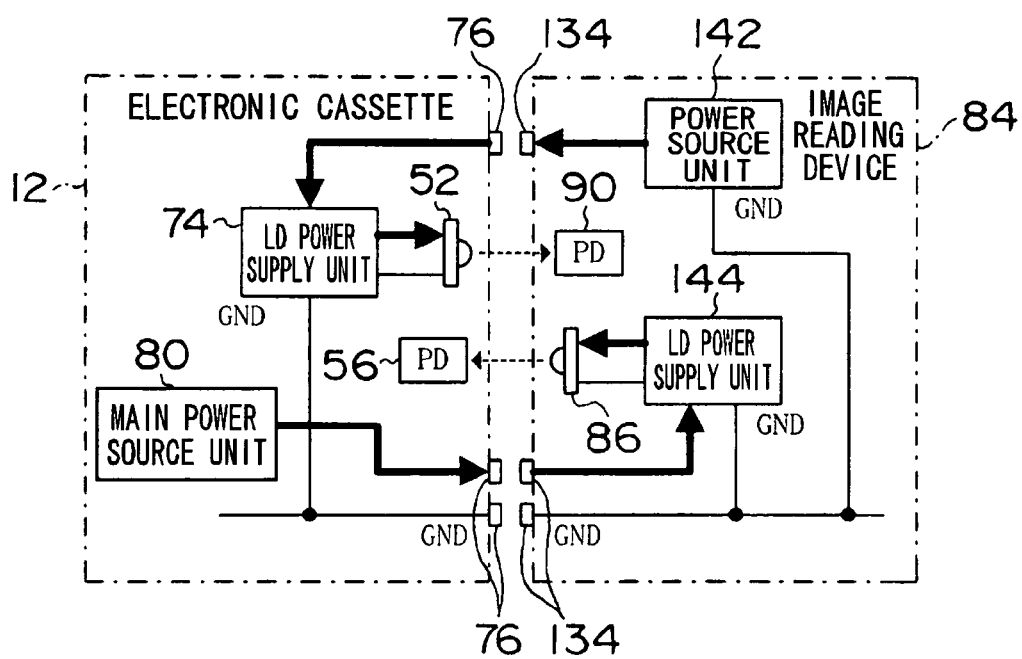

Explanation has been given above of a configuration, as shown in FIG. 7A, in which power is supplied to the LD power supply unit 74 of the electronic cassette 12 from the power source unit 142 of the image reading device 84 through the electrical contacts 76, 134, and a potion of the power supplied to the LD power supply unit 74 is supplied to the LD power supply unit 144 of the image reading device 84 through the electrical contacts 76, 134, there is however no limitation thereto. For example, a configuration may be adopted, as shown in FIG. 7B, with power supplied to the LD power supply unit 74 of the electronic cassette 12 from the power source unit 142 of the image reading device 84 through the electrical contacts 76, 134, and power supplied to the LD power supply unit 144 of the image reading device 84 from the LD power supply unit 144 of the image reading device 84 via an internal power supply line in the image reading device 84. A configuration may also be adopted, for example as shown in FIG. 7C, with power supplied to the LD power supply unit 74 of the electronic cassette 12 from the power source unit 142 of the image reading device 84 through the electrical contacts 76, 134, and power supplied to the LD power supply unit 144 of the image reading device 84 from the main power source unit 80 of the electronic cassette 12 via the electrical contacts 76, 134.

Figure 8A:
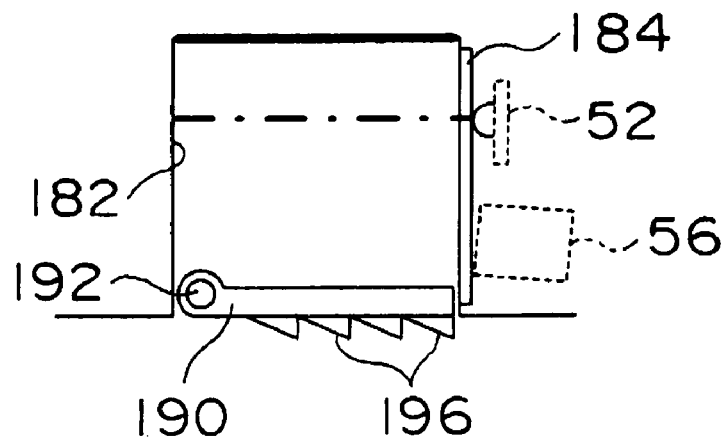
FIG. 8A and FIG. 8B are schematic diagrams showing a mode in which a reflective material has been provided to an outer face of a lid portion for closing the groove of the electronic cassette.
Figure 8B:
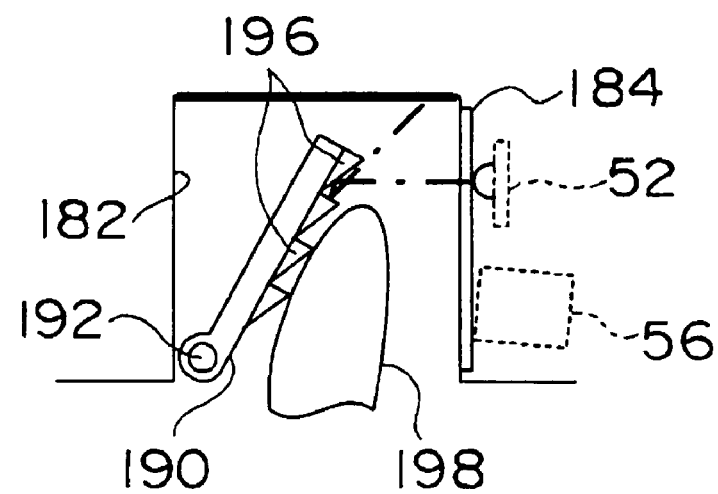

Explanation has been given above of a mode in which a diffusing material or an absorbing material is provided to the external face of the lid portion 190 that faces out from the casing 20 when the lid portion 190 is held in a closed position (see FIG. 6B), however there is no limitation thereto. For example, as shown in FIG. 8A and FIG. 8B, the external face of the lid portion 190 may be profiled such that when the lid portion 190 is rotated up to a position where laser light emitted from the LD 52 is irradiated to the external face of the lid portion 190, this irradiated light is reflected in a direction so as not to be emitted out from the groove 182. FIG. 8A and FIG. 8B show an example in which the external face of the lid portion 190 is formed with successive reflecting members 196, each reflecting member 196 being provided with a perpendicular face that is perpendicular to the external face, and an angled face that is angled with respect to the external face. In this example, when the lid portion 190 is rotated, from the state in which the opening section of the groove 182 is closed off by the lid portion 190 (the state shown in FIG. 8A), by a body 198 (for example the finger of a user or the like) to a position in which laser light emitted from the LD 52 is irradiated on the external face of the lid portion 190, as shown in FIG. 8B, the laser light irradiated onto the external face of the lid portion 190 can be reflected by the reflecting members 196 toward the bottom face of the groove 182, and laser light leaking from the groove 182 can be reduced. It should be noted that there is no limitation to the profile of the reflecting members 196 shown in FIG. 8A and FIG. 8B, and any profile capable of reflecting irradiated laser light in a direction such that it is not emitted from the groove 182 is applicable.

Explanation has been given of a mode in which the electronic device according to the present invention described above is the electronic cassette 12 and the image reading device 84, and modes of communication are performed by emitting respective laser light. However configuration may be made in which information transmission is carried out by emission of laser light from one of the communicating devices, with the other of the communicating devices carrying out information transmission with another communications means (for example by infrared rays or the like). In such a case, in consideration of the fact that wireless communication using infrared laser light is executed at extremely high transmission speeds, it is preferable to select the device that transmits the larger amount of information as the device transmitting information by laser light emission (for example in the case of an electronic cassette and an image reading device, the electronic cassette transmitting the image data should be selected).

Explanation has been given of the electronic cassette 12 (transportable radiographic imaging conversion device) and image reading device 84 as preferable examples of the electronic device according to the present invention, however the present invention is not limited thereto and the present invention is applicable to any electronic device carrying out wireless communication with another device. In particular, in consideration of the fact that wireless communication using infrared laser light is executed at extremely high transmission speeds, one of the devices is preferably transportable, and the electronic device preferably transmits or receives large amounts of data by wireless communication, or has exacting requirements with respect to transmission or receipt of large amounts of data. Examples of electronic devices according to the present invention include application to imaging devices, such as digital still cameras or digital video cameras, and to equipment that receives still image data or video image data from such imaging devices, such as PCs and printers, with wireless communication carried out by laser light therebetween. Examples of electronic devices according to the present invention include application to portable scanners, and to equipment that receives still image data from such scanners, such as PCs and printers, with wireless communication carried out by laser light therebetween. Examples of electronic devices according to the present invention include application to portable devices provided with at least one function for imaging still images or video images or for reproducing music (for example a portable phone or PDA), with wireless communication carried out by laser light used between such portable devices to exchange image data and music data.

Figure 9A:
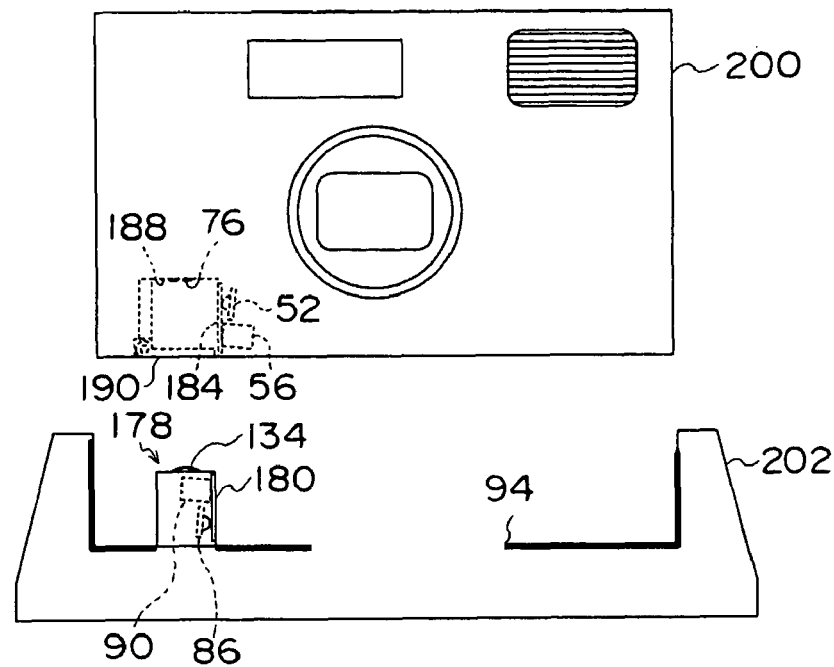
FIG. 9A and FIG. 9B are schematic diagrams showing one mode in which the present invention is applied to a digital camera and cradle.
Figure 9B:
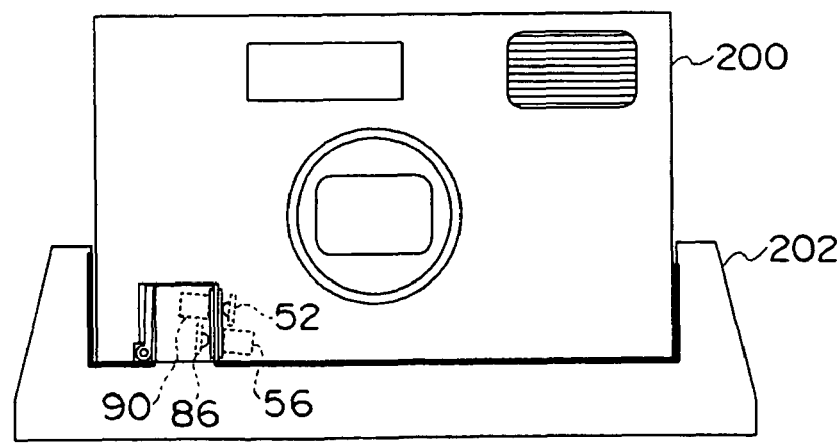

FIGS. 9A and 9B show one example of an electronic device according to the present invention, a mode in which application is made to a digital still camera 200 and to a cradle 202 on which the digital still camera 200 is set, during read out of image data from the digital still camera 200 and during recharging of an internal battery of the digital still camera 200. The LDs 52, 86 are also operated in this mode by power supplied from the opposing device through the electrical contacts 76, 134, and therefore safety can be assured when the positional relationship to the opposing device is not appropriate.

Figure 10:
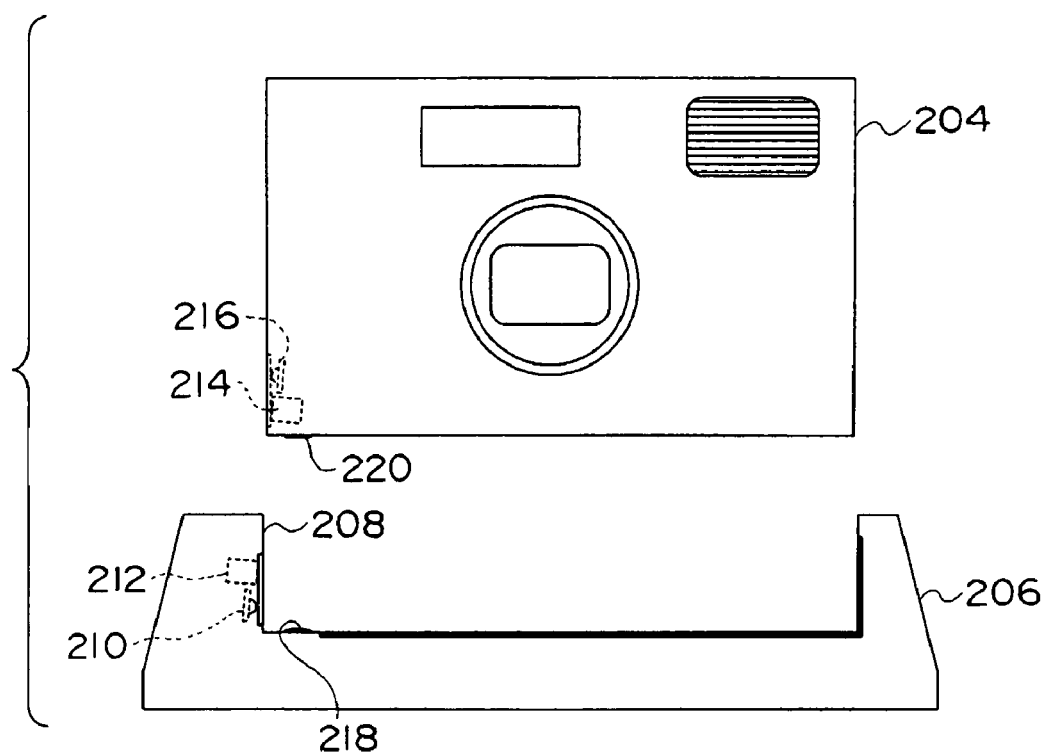
FIG. 10 is a schematic diagram showing a different mode in which the present invention is applied to a digital camera and cradle.

Explanation has been given above of a mode in which the protrusion portion 178 protrudes upwards within the insertion groove 172 of the casing 94 of the image reading device 84, the groove 182 is provided to the casing 20 of the electronic cassette 12, the LD 86, the PD 90 and the electrical contacts 134 are provided to the protrusion portion 178, the LD 52 and the PD 56 are provided to a side of the groove 182, and the electrical contacts 76 are provided to the bottom face of the groove 182, however there is no limitation thereto. For example, as shown in FIG. 10, the protrusion portion, such as the protrusion portion 178, and the recessed portion, such as the groove 182, may be omitted, with the casing of a first electronic device (a cradle 206 in the example of FIG. 10) formed with a recessed portion 208 into which a second electronic device (a digital still camera 204 in the example of FIG. 10) is inserted, with an LD 210 and a PD 212 disposed on a side wall portion of the recess portion 208 such that at least the direct laser light emitted from the LD 210 is emitted in a direction so as not to be emitted from the recessed portion 208, and with a PD 214 and an LD 216 provided at positions on the casing of the second electronic device so as to face the LD 210 and the PD 212 respectively when the casing is set to the recessed portion 208. In such cases, electrical contacts 218 of the first electronic device can be provided, for example, to the bottom face of the recessed portion 208, and electrical contacts 220 of the second electronic device can be provided, for example, at positions in the bottom face of the casing corresponding to the electrical contacts 218.

In the mode explained above the protrusion portion 178 and the groove 182 are provided in asymmetric positions, and so insertion of the casing 20 of the electronic cassette 12 in a back-to-front state into the insertion groove 172 can be prevented before it occurs. However, as shown in FIG. 10, if the protrusion portion 178 and the groove 182 are omitted, if the electrical contacts 218, 220 are provided in asymmetric positions, while it is not possible to prevent the insertion itself of the casing of the second electronic device back-to-front into the recessed portion 208, emission of laser light from the LDs 210, 216 can be prevented when the casing of the second electronic device is inserted into the recessed portion 208 in a back-to-front state.

Figure 11A:
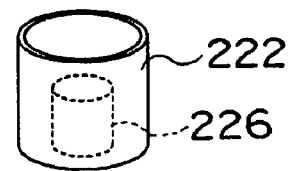
FIG. 11A to FIG. 11C are schematic diagrams showing other examples of electrical contacts according to the present invention.
Figure 11B:
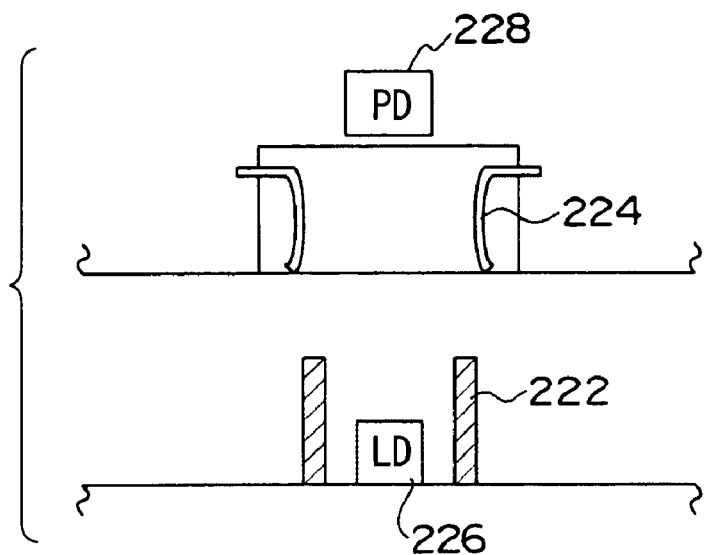
Figure 11C:
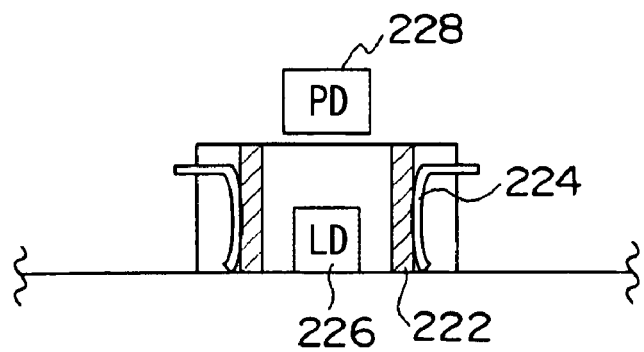

In addition, various shapes are applicable for the contacts according to the present invention, for example, one of the first contact or the second contact may be made as a cylindrical electrical contact 222 like that shown in FIG. 11A, and the other made as a ring shaped electrical contact 224 contactable with the electrical contact 222 around the whole of the circumference of the electrical contact 222, as shown in FIG. 11B. In such a case the electrical contact 222, the electrical contact 224, the LD 226, and the PD 228 may be so positioned such that, in the adjusted state of the relative position between the electronic devices in which communication by laser light is carried out, the communication enabled position, as shown in FIG. 11C, the electrical contact 222 and the electrical contact 224 are in contact, such that in the contact state of the electrical contact 222 and the electrical contact 224 a central portion thereof forms a light path for laser light (such that the periphery of the light path for laser light is covered in the contact state of the electrical contact 222 and the electrical contact 224). By so doing, even if an external force is imparted to one or more of the electronic devices whose relative position has been adjusted to the communication enabled position, and a small displacement occurs in the relative position of the electronic devices from the adjusted communication enabled position, laser light leakage can be even more assuredly prevented since the periphery of the laser light path is covered by the electrical contact 222 and the electrical contact 224 remaining in the contact state as long as the state of contact of the electrical contact 222 and electrical contact 224 is maintained.

What is claimed is:

1. An electronic device having a first emission unit for emitting laser light and a first modulating unit for modulating the laser light emitted from the first emission unit according to transmission information, wherein the relative position of a casing of an opposing device and a casing of the electronic device are in an adjusted state to a communication enabled position in which the laser light emitted from the first emission unit is incident within a light receiving region of the opposing device, and the transmission information is received by a receiving unit of the opposing device by detecting the laser light incident in the light receiving region, and by demodulating the transmission information from the detection result of the laser light; the electronic device comprising:

a first contact that contacts a second contact provided on the opposing device when the relative position of the casing of the opposing device and the casing of the electronic device is in the adjusted state to the communication enabled position; and a first electrical supply unit for supplying to the first emission unit as power for emitting the laser light power that has been supplied from the opposing device through the first contact in contact with the second contact, wherein one of the first contact or the second contact is a cylindrical shape, and the other is a ring shape so as to be contactable with the other cylindrical shaped electrical contact around the whole of the circumference of the electrical contact, and the first contact and the second contact are attached to the respective devices such that the periphery of a light path for the laser light emitted from the first emission unit is covered by contact of the electrical contact on the electronic device with the opposing contact when the relative position of the casing of the opposing device and the casing of the electronic device is in the adjusted state to the communication enabled position.

2. The electronic device according to claim 1, further comprising a control unit for: monitoring the power supply state from the opposing device through the first contact in contact with the second contact; and warning when there has been a change in the power supply state, and/or stopping emission of laser light from the first emission unit when there has been a change in the power supply state.

3. The electronic device according to claim 1, further comprising: a third contact in contact with a fourth contact provided on the opposing device when the relative position of the casing of the opposing device and the casing of the electronic device is in the adjusted state to the communication enabled position, wherein the first electrical supply unit supplies a portion of the power supplied from the opposing device through the first contact in contact with the second contact to the opposing device through the third contact in contact with the fourth contact.

4. The electronic device according to claim 3, wherein the opposing device is configured for two-way communication by laser light with the electronic device, and comprises: a second emission unit for emitting laser light; a second modulating unit for modulating the laser light emitted from the second emission unit according to transmission information; a second electrical supply unit for supplying power through the second contact in contact with the first contact; and a third electrical supply unit for supplying to the second emission unit power that has been supplied through the fourth contact in contact with the third contact, as power for emitting the laser light, wherein, the laser light emitted from the second emission unit of the opposing device is also incident within a light receiving region of the electronic device when the relative position of the casing of the opposing device and the casing of the electronic device is in the adjusted state to the communication enabled position, and the electronic device comprises a receiving unit for receiving the transmission information from the opposing device by detecting the laser light incident within the light receiving region of the electronic device when the relative position of the casing of the opposing device and the casing of the electronic device is in the adjusted state to the communication enabled position, and demodulating the transmission information from the detection result of the laser light.

5. The electronic device of claim 1 wherein the laser light is non-visible laser light of wavelength outside of the visible region.

6. The electronic device of claim 5 wherein the laser light is non-visible laser light of wavelength in the infrared region.

7. The electronic device of claim 1 wherein the electronic device is one or other of an imaging device, a portable information device, a transportable radiographic imaging conversion device, or an image read-out device for reading out image information from a transportable radiographic imaging conversion device.

* * * * *